(12) United States Patent
Sallas

(10) Patent No.: US 8,559,275 B2
(45) Date of Patent: Oct. 15, 2013

(54) SYSTEM AND METHOD FOR DETERMINING A FREQUENCY SWEEP FOR SEISMIC ANALYSIS

(75) Inventor: John J. Sallas, Plano, TX (US)

(73) Assignee: CGG Veritas, Houston, TX (US)

( * ) Notice: Subject to any disclaimer, the term of this patent is extended or adjusted under 35 U.S.C. 154(b) by 0 days.

(21) Appl. No.: 13/585,213

(22) Filed: Aug. 14, 2012

(65) Prior Publication Data

US 2012/0307597 A1 Dec. 6, 2012

Related U.S. Application Data

(63) Continuation of application No. 12/576,804, filed on Oct. 9, 2009, now Pat. No. 8,274,862.

(51) Int. Cl.
*G01V 1/00* (2006.01)

(52) U.S. Cl.
CPC . *G01V 1/00* (2013.01); *G01V 1/005* (2013.01)
USPC .............................................. 367/189; 367/45

(58) Field of Classification Search
USPC ............................................. 367/45; 702/17
See application file for complete search history.

(56) References Cited

U.S. PATENT DOCUMENTS

| | | | |
|---|---|---|---|
| 3,208,550 | A | 9/1965 | Castanet et al. |
| 4,512,001 | A | 4/1985 | Mayne et al. |
| 4,680,741 | A | 7/1987 | Wales et al. |
| 5,331,607 | A | 7/1994 | Roessler |
| 5,721,710 | A | 2/1998 | Sallas et al. |
| 7,327,633 | B2 * | 2/2008 | Bagaini et al. ............... 367/45 |
| 2007/0250269 | A1 * | 10/2007 | Wei et al. ...................... 702/17 |

OTHER PUBLICATIONS

Sallas, John J.; "How do hydraulic vibrators work? A look inside the black box" Vibroseis 1958-2008 Golden Anniversary; pp. 1-52.
Anstey, Nigel A.; "Vibroseis", Prentice Hall, Inc., Englewood Cliffs, New Jersey, 1991; pp. 114-124.
Bagaini, C.; "Low-frequency vibroseis data with maximum displacement sweeps", The Leading Edge, May 2008; 27, 582-591.
Baeten, G. and Strijbos, F.; "Wave Field of a Vibrator on a Layered Half-Space: Theory and Practice", SEG Expanded Abstracts, 1988, pp. 92-96.
Baeten, G. and Ziolkowski, A.; "The Vibroseis Source", 1990, pp. 166-169.
Luco, J.E., "Impedence Functions for a Rigid Foundation on a Layered Medium", Nuclear Engineering and Design, 1974, pp. 204-217.

(Continued)

*Primary Examiner* — Krystine Breier
(74) *Attorney, Agent, or Firm* — Patent Portfolio Builders, PLLC

(57) ABSTRACT

A sweep generator is employed to generate a sweep to be used by a seismic vibrator device for generating a desired target output spectrum, wherein the frequency sweep is designed so as to comply with one or more constraints imposed by the seismic vibrator device and/or imposed by the environment in which the device is to be used. In one embodiment, a sweep generator determines a sweep for achieving a desired target output spectrum by a given seismic vibrator device in compliance with at least a pump flow constraint imposed by the seismic vibrator device. In another embodiment, a sweep generator determines a sweep for achieving a desired target output spectrum by a given seismic vibrator device in compliance with all of multiple operational constraints of the seismic vibrator device, such as both mass displacement and pump flow constraints. Environmental constraints may also be accounted for in certain embodiments.

17 Claims, 20 Drawing Sheets

(56) References Cited

OTHER PUBLICATIONS

Merritt, H.E., "Hydraulic Control Systems", John Wiley & Sons, © 1967 pp. 60-69, 78-87, 146-149,212-217.

Miller, G.F. and Pursey, H., "The field and radiation impedance of mechanical radiators on the free surface of a semi-infinite isotropic solid" Proceedings of the Royal Society, 1954 series A 223,521-541.

Miller, G.F. and Pursey, H., "On the partition of energy between elastic waves in a semi-infinite solid" Proceedings of the Royal Society, 1954 series A 233, pp. 55-69.

Mougenot, D., "Toward the low frequencies: land and marine equipment", First Break vol. 24, Jul. 2006, pp. 37-41.

Safar, M.H., "On the determination of the downgoing p-waves radiated by the vertical seismic vibrator", Geophysical Prospecting 32, 392-405,1984.

Sallas, J.J., "Seismic vibrator control and the downgoing P-wave", Geophysics vol. 49, No. 6, Jun. 1984; pp. 732-740.

Sallas, J.J., Gibson, J.B., Lin, F., Winter, 0., Montgomery, B., Nagarajappa, P., "Broadband Vibroseis using simUltaneous pseudo-random sweeps", SEG Expanded Abstracts, 100-104.

Wei, Z., Sallas, J., Crowell, J., Teske, J; "Harmonic distortion reduction on vibrators-SuppressinQ the supply pressure ripples" SEG Expanded Abstracts 2007, pp. 51-55.

\* cited by examiner

VARIABLE DISPLACEMENT AXIAL PISTON PUMP

SYSTEM AND METHOD FOR DETERMINING A FREQUENCY SWEEP FOR SEISMIC ANALYSIS

RELATED APPLICATION

This application is a Continuation of co-pending application Ser. No. 12/576,804, filed on Oct. 9, 2009, the entire contents of which are hereby incorporated by reference into the present application and for which priority is claimed under 35 U.S.C. §120.

TECHNICAL FIELD

The following description relates generally to seismic exploration, and more particularly to systems and methods for creating frequency sweeps to be used by a seismic vibrator device for generating a desired target output spectrum.

BACKGROUND

In the oil and gas industry, geophysical prospecting techniques are commonly used to aid in the search for and evaluation of subterranean hydrocarbon and/or other mineral deposits. Generally, a seismic energy source is used to generate a seismic signal that propagates into the earth and is at least partially reflected by subsurface seismic reflectors interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

Various sources of seismic energy have been utilized in the art to impart the seismic waves into the earth. As discussed further below, such sources have included two general types: 1) impulsive energy sources, such as dynamite, and 2) seismic vibrator sources. The first type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data generally have a relatively high signal-to-noise ratio, which facilitates subsequent data processing operations. On the other hand, use of an impulsive energy source can pose certain safety and environmental concerns.

Since the late 1950s and early 1960s, the second type of geophysical prospecting has developed, which employs a seismic vibrator (e.g., a land or marine seismic vibrator) as the energy source, wherein the seismic vibrator is commonly used to propagate energy signals over an extended period of time, as opposed to the near instantaneous energy provided by impulsive sources. Thus, a seismic vibrator may be employed as the source of seismic energy which, when energized, imparts relatively low-level energy signals into the earth. The seismic process employing such use of a seismic vibrator is sometimes referred to as "VIBROSEIS" prospecting. In general, vibroseis is commonly used in the art to refer to a method used to propagate energy signals into the earth over an extended period of time, as opposed to the near instantaneous energy provided by impulsive sources. The data recorded in this way is then correlated to convert the extended source signal into an impulse. The source signal using this method was originally generated by an electric motor driving sets of counter-rotating eccentric weights, but these were quickly replaced by servo-controlled hydraulic vibrator or "shaker unit" mounted on a mobile base unit. Roughly, half of today's land seismic data surveys use P-wave hydraulic vibrators for sources. Hydraulic seismic vibrators are popular, at least in part, because of the high energy densities of such devices.

Typically, the impartation of energy with vibrator devices is for a preselected energization interval, and data are recorded during the energization interval and a subsequent "listening" interval. It is desirable for the vibrator to radiate varying frequencies into the earth's crust during the energization interval. In such instances, energy at a starting frequency is first imparted into the earth, and the vibration frequency changes over the energization interval at some rate until the stopping frequency is reached at the end of the interval. The difference between the starting and stopping frequencies of the sweep generator is known as the range of the sweep, and the length of time in which the generator has to sweep through those frequencies is known as the sweep time.

Vibrators typically employ a sweep generator, and the output of the sweep generator is coupled to the input of the vibrator device. The output of the sweep generator dictates the manner in which the frequency of the energization signal, which is imparted into the earth, varies as a function of time.

Several methods for varying the rate of change of the frequency of the sweep generator during the sweep time have been proposed. For example, in the case of a linear sweep, the frequency output of the sweep generator changes linearly over the sweep time at the rate dictated by the starting and stopping frequencies and the sweep time. Further, nonlinear sweeps have been proposed in which the rate of change of the frequency of the sweep generator varies nonlinearly between the starting and stopping frequencies over the sweep time. Examples of nonlinear sweeps have been quadratic sweeps and logarithmic sweeps.

In seismic surveys conducted on dry-land, a seismic vibrator imparts a signal into the earth, where the signal generally has a much lower energy level than a signal generated by an impulsive energy source; however, the seismic vibrator can generate a signal for longer periods of time. Vibrators for use in marine seismic surveying typically comprise a bell-shaped housing having a large and heavy diaphragm in its open end. The vibrator is lowered into the water from a marine survey vessel, and the diaphragm is vibrated by a hydraulic drive system similar to that used in a land vibrator. Alternative marine vibrator designs comprise two hemispherical shells or a curved shell with flat radiating piston, where the two shells are driven by an interconnected actuator and there is also some form of sealing mechanism between the two shells, so that a volumetric source is formed when the vibrator is excited. The hydraulic actuator moves the two members relative to one another in a similar manner to the movement of the reaction mass in a land vibrator. Marine vibrators are therefore subject to operational constraints analogous to those of land vibrators. Except where expressly stated herein, "seismic vibrator" is intended to encompass any seismic vibrator implementation, including any dry land or marine implementation thereof.

The seismic signal generated by a seismic vibrator is a controlled wavetrain—a sweep signal containing different frequencies—that may be emitted into the surface of the earth, a body of water or a borehole. In a seismic vibrator for use on land, energy may be imparted into the ground in a swept frequency signal. Typically, the energy to be imparted into the ground is generated by a hydraulic drive system that vibrates a large weight, known as the reaction mass, up and down. The hydraulic pressure that accelerates the reaction mass acts also on a piston that is attached to a baseplate that is in contact with the earth and through which the vibrations are transmitted into the earth. Very often, the baseplate is coupled with a large fixed weight, known as the hold-down weight that maintains contact between the baseplate and the ground as the reaction mass moves up and down. The seismic sweep produced by the seismic vibrator is generally a sinusoidal vibration of continuously varying frequency, increasing or decreasing monotonically within a given frequency range. Seismic sweeps often have durations between 2 and 20 seconds. The instantaneous frequency of the seismic sweep may vary linearly or nonlinearly with time. The ratio of the instantaneous frequency variation over the unit time interval is defined sweep rate. Further, the frequency of the seismic sweep may start low and increase with time (i.e., "an upsweep") or it may begin high and gradually decrease (i.e., "a downsweep"). Typically, the frequency range today is, say from about 3 Hertz (Hz) to some upper limit that is often less than 200 Hz, and most commonly the range is from about 6 Hz to about 100 Hz.

The seismic data recorded during vibroseis prospecting (hereinafter referred to as "vibrator data") comprises composite signals, each having many long, reflected wavetrains superimposed upon one another. Since these composite signals are typically many times longer than the interval between reflections, it is not possible to distinguish individual reflections from the recorded signal. However, when the seismic vibrator data is cross-correlated with the sweep signal (also known as the "reference signal"), the resulting correlated data approximates the data that would have been recorded if the source had been an impulsive energy source.

In many implementations, vibroseis technology uses vehicle-mounted vibrators (commonly called "vibes") as an energy source to impart coded seismic energy into the ground. The seismic waves are recorded via geophones and subsequently subjected to processing applications. Today, various sophisticated vibrator systems are available for use, including minivibes, truck-mount vibes and buggy-mount vibes, any of which may be selected for use in a given application to provide the best possible solutions to meet a specific seismic program needs.

It is known in the seismic exploration art that the higher frequencies of energization signals are attenuated to a greater degree than lower frequency energization signals, and most authorities have concluded that the attenuation of the earth in decibels is directly proportional to the frequency of the energization signal. Further, the total attenuation of any specific signal is known to be dependent upon the velocity, layering, thickness and attenuation coefficients of each layer traversed, as well as the frequency range.

Even though the earth attenuation is known to increase with increasing frequency of the energization signals, linear sweeps have been extensively used in vibrators. Techniques for emphasizing the lower amplitude higher frequency responses are well-known and have been employed to account for the attenuation applied to these higher frequency seismic signals by the earth.

Low frequencies (e.g., below 10 Hz) are of interest today due, at least in part, to increased interest in performing acoustic impedance inversion. If seismic data can be obtained that is sufficiently quiet, then the acoustic impedance inversion process can be performed, which may result in some useful geotechnical information. An additional benefit of using low frequencies is that low frequencies penetrate farther than high frequencies, and so their use may permit evaluation of the Earth's subsurface at deeper levels. Further, by including some low frequency content in the data, it may help improve the continuity of reflectors and characteristics being imaged in the subsurface under evaluation.

SUMMARY

The present invention is directed generally to systems and methods for creating frequency sweeps to be used by a seismic vibrator device for generating a desired target output spectrum. According to embodiments of the present invention, a sweep generator is employed to generate a sweep to be used by a seismic vibrator device for generating a desired target output spectrum, wherein the frequency sweep is designed so as not to comply with (or "honor") one or more constraints imposed by the seismic vibrator device and/or imposed by the environment in which the device is to be used. In one embodiment, a sweep generator determines a sweep for achieving a desired target output spectrum by a given seismic vibrator device in compliance with at least a pump flow (also referred to as "fluid flow") constraint imposed by the seismic vibrator device. In another embodiment, a sweep generator determines a sweep for achieving a desired target output spectrum by a given seismic vibrator device in compliance with multiple constraints of the seismic vibrator device, such as constraints imposed by both the mass displacement and hydraulic pump flow of the device. Thus, in certain embodiments, the sweep generator takes into consideration multiple operational constraints of the seismic vibrator device when designing a sweep, such as constraints imposed by the mass displacement and hydraulic pump flow of the seismic vibrator device and/or environmental constraints, to ensure that the resulting generated sweep honors (i.e., does not violate) those multiple constraints.

Seismic vibrators in use today have constraints that impose frequency-variant limits on their output amplitude spectrum. Certain constraints have been recognized in the art. For instance, Sagaini et al (U.S. Pat. No. 7,327,633) have recognized that mass displacement (or "stroke") of a seismic vibrator device imposes a constraint. However, while a given constraint, such as mass displacement, of a seismic vibrator has been considered when designing a sweep for achieving a desired target output spectrum by the seismic vibrator, such consideration of a single constraint fails to take into account other constraints that may impose limitations on the sweep, and thus the resulting designed sweep may fail to operate properly when implemented on the seismic vibrator.

Seismic vibrators in use today have various constraints that impose frequency-variant limits on their output amplitude spectrum. These include but are not limited to: reaction mass stroke, maximum deliverable pump flow, hold-down weigh, servo-valve response, available supply pressure, and the driven structure response. The problem is compounded by other effects like absorption of high frequency energy and environmental noise. While a conventional linear sweep may work well enough to image the subsurface given enough sweep time, it may not provide the most economical solution especially if it requires the use of very long sweep times or many shots at a particular location. According to certain embodiments of the present invention, a sweep generator employs a procedure that creates a nonlinear sweep to build up the sweep spectral density to achieve a target spectrum (that is defined by the user to meet the geophysical survey objectives) in compliance with (i.e., without violating) various constraints of the seismic vibrator. In another embodiment of this invention, other constraints such as environmental constraints (which may be defined by an operator or derived from prior data about a target location) can be imposed, and the sweep generator employs a procedure for determining a sweep (e.g., a nonlinear sweep) to achieve the target spectrum in compliance with those other constraints in addition to or instead of the constraint(s) of the seismic vibrator that are accounted for by the sweep generator. For example, when working near populated areas it may be desirable to reduce the instantaneous peak amplitude of the vibrator force through a certain range of frequencies so as not to excite some structural resonance. Likewise, the sweep generation techniques described herein may be implemented to compensate for a drop in instantaneous amplitude through a range of frequencies imposed by environmental constraints and a suitable nonlinear sweep may be generated to build up the sweep spectral density to achieve a target spectrum. Thus, while many of the examples described herein provide techniques for determining a sweep that achieves a target spectrum in compliance with operational constraints of a seismic vibrator device, such as its fluid flow and/or mass displacement constraints, the techniques may likewise be employed to further ensure that a sweep is determined to achieve the target spectrum in compliance with environmental constraints (e.g., which may be defined by a user).

The amount of energy injected into the earth by a seismic vibrator during a conventional vibrator sweep is governed by the size of the vibrator and the duration of the sweep. As mentioned above, there are several constraints on the amplitude of the vibrations that are imposed by the seismic vibrator device being used. One such constraint is that the hold-down weight must exceed the maximum upward force, so that the vibrator never loses contact with the ground.

However, there are other constraints on low frequency output. As discussed above, the ground force is generated by vibrating the reaction mass and the baseplate. The force transmitted to the ground is commonly estimated using the sum of the reaction mass and baseplate accelerations weighted by the mass of the reaction mass and baseplate assembly mass, respectively. At low frequencies, the main component to the ground force is by far that due to the reaction mass since the baseplate acceleration is negligible with respect to the reaction mass acceleration. As such, to generate the same ground force at low frequencies requires greater peak velocities and displacements of the reaction mass than for higher frequencies. Typically, the lowest frequency that can be produced by a vibrator at a fixed force level is determined by the maximum stroke length possible for the reaction mass, and the amount of time that the seismic vibrator can dwell at low frequencies is determined by the amount of hydraulic fluid stored in accumulators at the start of the sweep time and the maximum flow capacity of the hydraulic system.

Certain embodiments of the present invention comprise a sweep generator for creating a sweep for achieving a desired target output spectrum while complying with at least a pump flow constraint of a hydraulic seismic vibrator device. For example, as discussed above it has been recognized that the mass displacement of the seismic vibrator device may impose a constraint, but prior approaches have failed to recognize or address that the pump flow constraint, particularly when operating for long dwell periods at low frequency, often becomes the more limiting constraint. So, in certain embodiments of the present invention, multiple constraints are taken into account by the sweep generator when creating a sweep. That is, multiple operational constraints, such as mechanical and/or hydraulic constraints, associated with a given seismic vibrator device, which limit the output force that can be produced, may be taken into account. For instance, multiple constraints, such as both mass displacement and pump flow constraints, of one or more seismic vibrator devices that are under evaluation are taken into account when creating a sweep for achieving a desired target output spectrum.

In certain embodiments, the sweep generator can receive input of specifications of one or more vibrator devices or it may be hard-coded with those specifications, and it can use those specifications to compute multiple constraints associated with each device. For instance, it may employ algorithms for computing such constraints as pump flow, mass displacement, etc. over various frequencies. The sweep generator may receive a desired target output spectrum and create, for the one or more vibrator devices, a frequency sweep for use in achieving the desired target output spectrum by such device. In creating such frequency sweep, the sweep generator evaluates the computed constraints for the device to ensure that the frequency sweep that is created complies with those constraints.

In certain embodiments, the sweep generator may evaluate multiple target vibrator devices and select a most appropriate one of the devices, such as one that is most optimal because it can achieve the target output spectrum by using a sweep that has a duration of a desired time period (e.g., the shortest time period). The sweep generator may be employed as a sanity check to confirm which one or more of the target vibrator devices are operationally capable of achieving the desired target output spectrum, i.e., confirm which one or more of the devices under evaluation are operationally capable (in compliance with its mechanical or hydraulic constraints) of supporting a sweep for achieving the desired target output spectrum.

It should be noted that this provides a quantitative approach. The sweep generator, according to certain embodiments, provides the ability to predetermine a sweep that will be known to achieve a target output spectrum while complying with multiple constraints (or at least the pump flow constraint) of a hydraulic seismic vibrator device. This differs from prior approaches that take into account only a single constraint, such as the mass displacement constraint, but failed to take into account other constraints, such as the pump flow constraint which, particularly for sweeps that include long dwell periods at low frequency, may be a more limiting constraint. While the pump flow constraint was present in the vibrator devices and may have eventually been recognized through trial and error when attempting to implement a designed sweep on a target seismic vibrator device, embodiments of the sweep generator proposed herein predetermine a sweep that is known to avoid violation of the constraints associated with the target seismic vibrator device. Thus, the resulting sweep designed by the sweep generator of one embodiment for achieving a desired target output spectrum by a target seismic vibrator device is predetermined to comply with at least the pump flow constraint of the device, and is preferably predetermined to comply with multiple constraints of the device.

The use of measured source signals and ability to control source spectral output in both amplitude and phase has led to many innovative ways to dramatically increase acquisition productivity. Over the years, there have been many articles devoted to Vibroseis topics, the vast majority of which fall into one of two groups: 1) a new sweep method or 2) processing issues. The few articles devoted to source engineering topics tend to focus on some new feature or a single attribute. Seismic vibrator manufactures are generally good about providing specifications for equipment, but oftentimes the geophysicist is not informed on how equipment limitations constrain performance and impact acquisition objectives. There have been very few articles in the geophysics literature devoted to a concise explanation of how the overall vibrator mechanical system typically works, and no proposal for a sweep generator that is operable to generate a sweep for achieving a desired target output spectrum on a given seismic vibrator device that is predetermined to comply with the seismic vibrator device's pump flow constraint, in addition to complying with other constraints such as mass displacement constraint.

According to one embodiment, a system comprises a sweep generator device that comprises interface logic for receiving input of information defining a desired target output spectrum to be achieved by a hydraulic seismic vibrator device. The sweep generator device further comprises sweep generation logic for determining a frequency sweep for achieving the desired target output spectrum by the hydraulic seismic vibrator device in compliance with a plurality of different constraints that are imposed by at least one of the hydraulic seismic vibrator device and a target environment in which the hydraulic seismic vibrator is to be used. In one embodiment, the plurality of different constraints include at least fluid flow and mass displacement constraints imposed by the hydraulic seismic vibrator device. The fluid flow constraint defines, for a range of frequencies, an operational constraint of the hydraulic seismic vibrator device imposed by its fluid flow, and the mass displacement constraint defines, for a range of frequencies, an operational constraint of the hydraulic seismic vibrator device imposed by a stroke distance of its reaction mass.

According to one embodiment of the present invention, a method comprises receiving, by a processor-based device, information defining a desired target output spectrum to be achieved by a hydraulic seismic vibrator device. The processor-based device then determines a frequency sweep for achieving the desired target output spectrum by the hydraulic seismic vibrator device in compliance with at least a fluid flow constraint imposed by the hydraulic seismic vibrator device. The frequency sweep may be a nonlinear frequency sweep. In certain embodiments, the processor-based device determines, based on specifications of the hydraulic seismic vibrator device, the fluid flow constraint that is imposed (e.g., over a range of frequencies encompassed by the desired output spectrum). Thereafter, the determined frequency sweep may be employed by the hydraulic seismic vibrator device for generating the desired target output spectrum.

According to one embodiment, a method comprises receiving, by a processor-based device, information defining a desired target output spectrum to be achieved by a hydraulic seismic vibrator device. The method further comprises determining, by the processor-based device, based at least in part on specifications of the hydraulic seismic vibrator device, at least a fluid flow constraint imposed by the hydraulic seismic vibrator device, wherein the fluid flow constraint defines, for a range of frequencies, an operational constraint of hydraulic seismic vibrator device imposed by its fluid flow. That is, the fluid flow constraint imposes a limit on force that can be generated by the hydraulic seismic vibrator over a certain range of frequencies. The processor-based device determines a frequency sweep for achieving the desired target output spectrum by the hydraulic seismic vibrator device in compliance with at least the fluid flow constraint. In certain embodiments, multiple constraints are taken into account by the processor-based device in determining the frequency sweep. For instance, in addition to fluid flow, mass displacement constraint may also be determined and taken into consideration. Various other constraints may likewise be determined and taken into consideration as discussed further herein.

The foregoing has outlined rather broadly the features and technical advantages of the present invention in order that the detailed description of the invention that Follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

In order to have realistic expectations of what output is achievable from a seismic vibrator, an understanding of the limitations/constraints imposed by the seismic vibrator machine being used in a given application is essential. Embodiments of the present invention employ a sweep development method and tool (or "sweep generator") that account for such constraints in order to make informed choices in the design of a sweep. According to certain embodiments, the sweep generator receives input defining a target output spectrum desired to be produced by a given seismic vibrator, and the sweep generator designs a frequency sweep for use by the seismic vibrator for achieving the desired target output spectrum, wherein the sweep generator accounts for at least the pump flow constraint of the seismic vibrator to ensure that the designed sweep does not violate that constraint. In certain embodiments, the sweep generator accounts for a plurality of different constraints of the seismic vibrator, such as both its pump flow constraint and mass displacement constraint, to ensure that the designed sweep complies with (or "honors") those plurality of constraints.

To aid the reader, the following description is divided into three parts: 1) a general overview of a typical vibroseis acquisition system, 2) a description of typical operation of an exemplary seismic vibrator device used in vibroseis acquisition and exemplary constraints that arise in use of such seismic vibrator devices, and 3) description of exemplary sweep generation systems and methods according to certain embodiments of the present invention, which employ methods and tools for developing sweeps for achieving a desired target output spectrum in compliance with constraint(s) imposed by a seismic vibrator to be used for employing a sweep for producing the desired target output spectrum.

Exemplary Vibroseis Acquisition System

The following description first provides a general overview of typical vibroseis acquisition system. The description is not intended to be limiting on the scope of the present invention, but is instead intended as an illustrative overview of typical vibroseis acquisition which provides a framework for discussion of exemplary application of embodiments of the present invention. Thus, embodiments of the present invention are not limited for use with the specific exemplary vibroseis acquisition system described below, but instead, the concepts described herein may be readily applied for use with various other types of vibroseis acquisition systems, both land-based and marine systems, as those of ordinary skill in the art will recognize.

Figure 1:
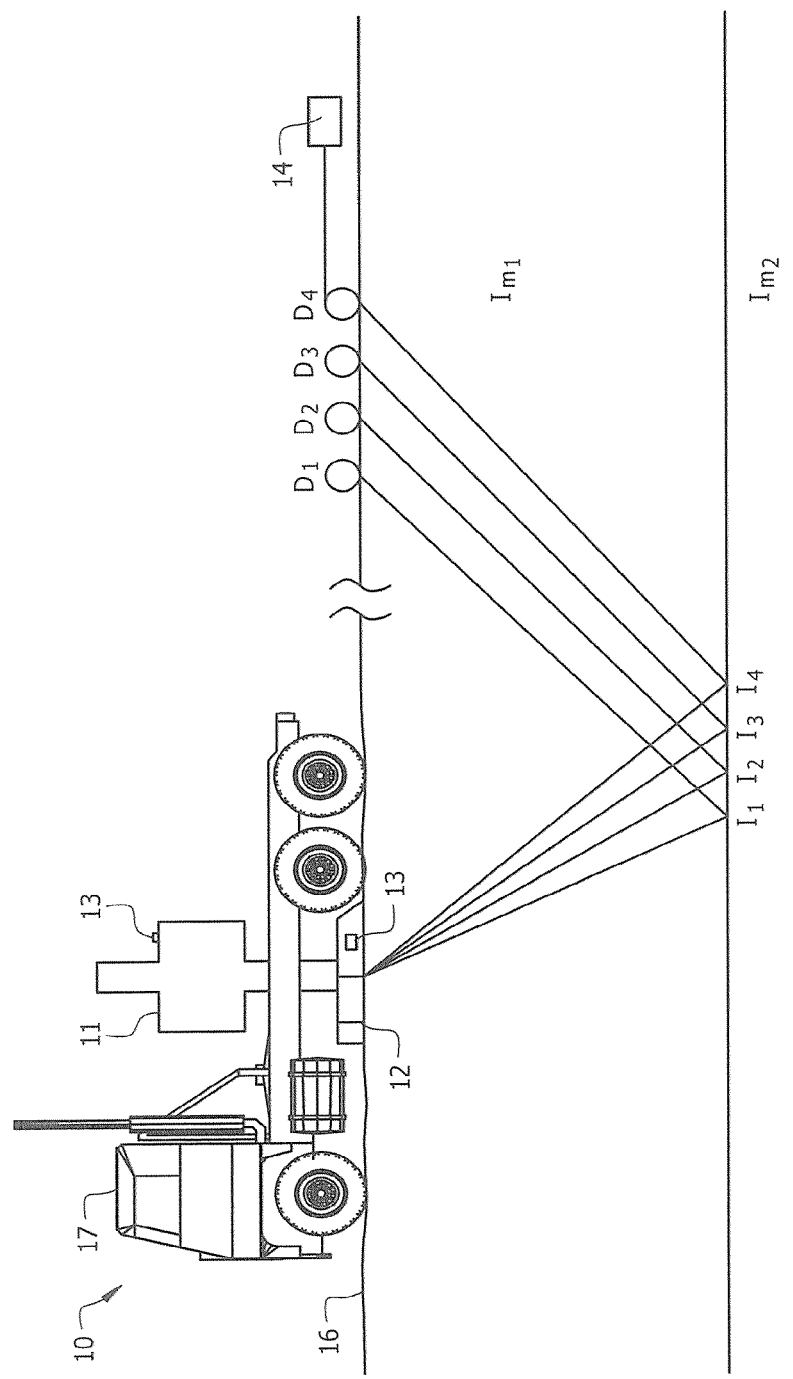
FIG. 1 shows the typical elements of a vibroseis acquisition system, such as may be used for producing an output spectrum according to a frequency sweep that is created by a sweep generator in accordance with embodiments of the present invention.

The system of FIG. 1 illustrates in a simplified manner the typical elements of a vibroseis acquisition system, such as may be used for producing an output spectrum according to a frequency sweep that is created by a sweep generator in accordance with embodiments of the present invention. In the illustrated system, a seismic vibrator 10 comprises a vibrating elements: reaction mass with a central bore that contains a piston to form a hydraulic actuator 11, a baseplate 12, and a signal measuring apparatus 13 (which is shown in this example as measuring signals from two sensors, one on the reaction mass and one on the baseplate). As one example, signal measuring apparatus 13 may comprise a plurality of accelerometers whose signals are combined to measure the actual ground-force signal applied to the earth by the seismic vibrator. The seismic vibrator 10 illustrated in FIG. 1 is constructed on a truck 17 that provides for maneuverability of the system. An exemplary implementation of the hydraulic system and actuator for the seismic vibrator 10 is shown and described further below with reference to FIG. 2. As illustrated in the example of FIG. 1, the hydraulic actuator 11 is coupled with the baseplate 12 to provide for the transmission of vibrations from the hydraulic actuator 11 to the baseplate 12. The baseplate 12 is positioned in contact with an earth surface 16, and the vibrations of the actuator 11 are communicated into the earth surface 16 via baseplate 12.

The seismic signal that is generated by the actuator 11 and emitted into the earth, via the baseplate 12, may be reflected off the interface between subsurface impedances $Im_1$ and $Im_2$ at points $I_1$, $I_2$, $I_3$, and $I_4$. This reflected signal is detected by receivers, such as geophones $D_1$, $D_2$, $D_3$, and $D_4$, respectively. The signals generated by the actuator 11 and the baseplate 12 are also transmitted to a data storage 14 for combination with raw seismic data received from geophones $D_1$, $D_2$, $D_3$, and $D_4$ to provide for processing of the raw seismic data. In operation, a drive signal, that is an output of the vibrator control electronics, causes the actuator 11 to exert a variable force on the baseplate 12. The vibrator control electronics adjusts the drive signal so that the ground force output of the vibrator matches the reference signal as closely as the system dynamics allow. In most cases, the seismic data received from geophones $D_1$, $D_2$, $D_3$, and $D_4$ is correlated with the reference signal so that the resulting correlated data approximates the data that would have bee recorded if the source had been an impulsive energy so urce.

Further details regarding exemplary vibroseis acquisition systems for which embodiments of the present invention may have application are provided in U.S. Pat. No. 7,327,633 titled "Systems and Methods for Enhancing Low-Frequency Content in Vibroseis Acquisition", U.S. Pat. No. 4,512,001 titled "Method and Apparatus for Seismic Exploration Using Nonlinear Sweeps", and U.S. Pat. No. 4,680,741 titled "Method and Apparatus for Seismic Exploration Using Non-Linear Sweeps", the disclosures of which are hereby incorporated herein by reference.

Exemplary Seismic Vibrator Device and Constraints that Arise in Use Thereof

The following description provides a general overview of typical hydraulic vibrator devices, which are commonly employed as actuator 11 in vibroseis acquisition system 10 (of FIG. 1). The description of the hydraulic vibrator device provided below is not intended to be limiting on the scope of the present invention, but is instead intended as an illustrative overview of typical hydraulic vibrator devices which provides a framework for discussion of exemplary application of embodiments of the present invention. Thus, embodiments of the present invention are not limited for use with the specific exemplary vibrator devices described below, but instead, the concepts described herein may be readily applied for use with various other types of vibrator devices.

Figure 2:
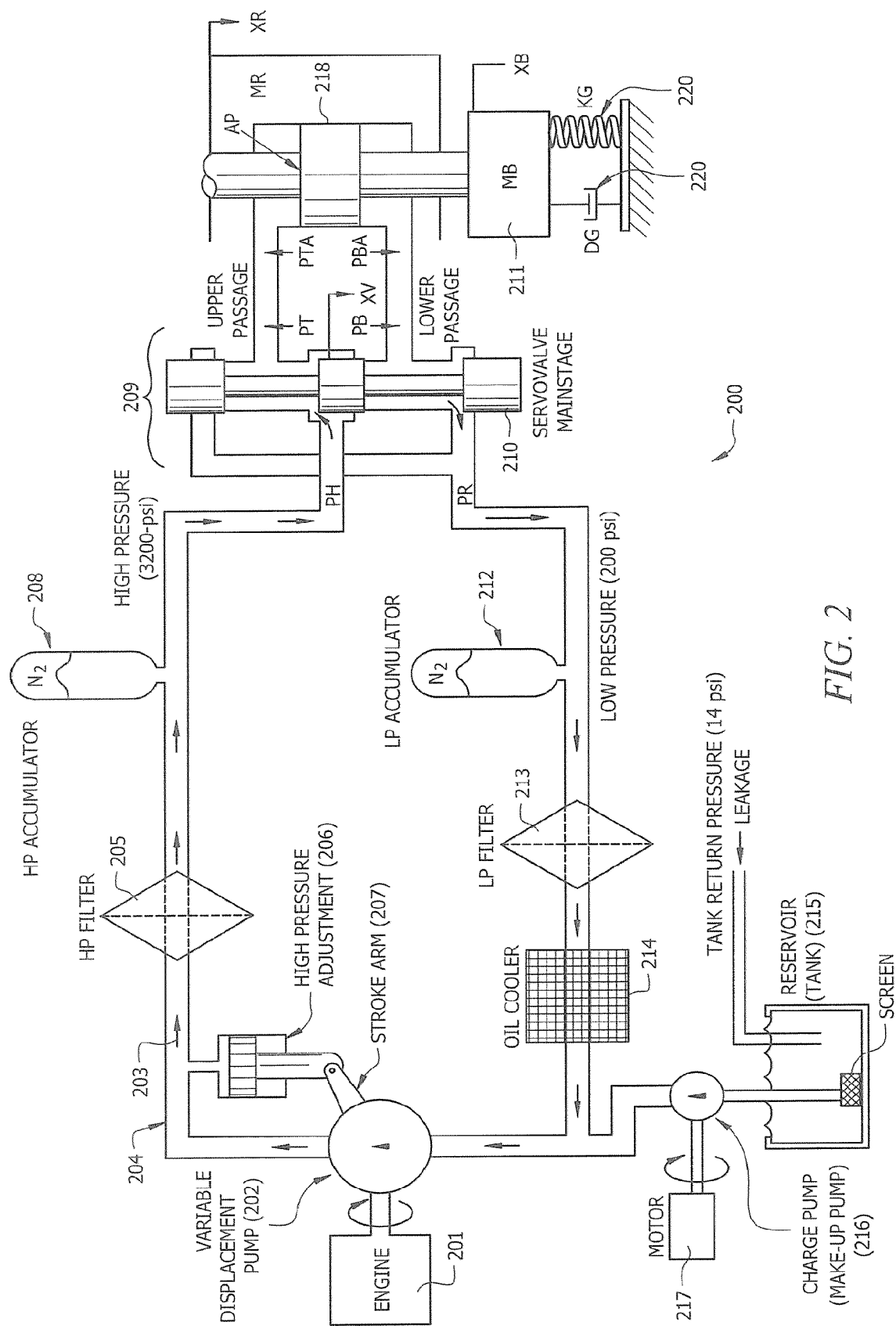
FIG. 2 shows an exemplary basic circuit of a typical hydraulic seismic vibrator.

An exemplary basic circuit of a typical hydraulic seismic vibrator 200 is shown in FIG. 2. Hydraulic seismic vibrator 200 includes an engine 201, which is typically a diesel engine that runs at a constant RPM (revolutions per minute), turning a variable displacement pressure-compensated piston pump 202 that supplies the flow of hydraulic fluid 203, which flows according to the arrows shown. Every revolution of the engine 201 generates a certain amount of flow. Accordingly, if the pump 202 were implemented as a fixed displacement pump, the amount of flow would remain constant. However, because when a frequency sweep is desired the flow demand changes over time, a variable displacement pump 202 is typically implemented. As discussed further hereafter with FIG. 4B, within the variable displacement pump 202, there is typically a swash plate (shown as swash plate 401 in FIG. 4B) that is coupled to pistons (shown as pistons 402 and 403 in FIG. 4b). By moving the swash plate, the amount that the pistons move in each revolution of the engine 201 can be varied. Therefore, pump 202 can vary the flow that it produces even though the engine RPM that is driving the pump shaft is generally constant.

Typically, a high pressure cylinder 206 that acts similar to a hydraulic actuator is implemented. Such cylinder 206 is sensitive to pressure, and it drives the stroke arm 207 on the pump 202. Consider for example that the cylinder 206 is set to 3,200 psi, and there is a large flow demand; over time, the pressure may start to drop in the system. Cylinder 206 will sense that drop in pressure, and it will move the stroke arm 207 on the pump 202 to increase the displacement of the pump per revolution, thereby creating more flow and increasing the pressure.

Following the arrows exiting the pump 202, passageways (e.g., hoses) 204 connect the pump's output through a filtration system 205 to the servovalve 209 that is under the control of the vibrator electronics (not shown for simplicity and ease of illustration). Filtration provided by the filtration system 205 removes particles that may slough off over time from hose interiors, seals or created by cavitations. Filtration system 205 might be two-micron or three-micron filters, for example, because the clearances inside the servo valves 209 are generally on the order of $1/10,000^{th}$ of an inch or $2/10,000^{th}$ of an inch.

Then there is a high pressure accumulator 208 which is implemented to remove any ripples or pressure spikes in the supply flow, either due to the changes in demand or pump noise. So, the accumulator 208 effectively acts similar to a filter capacitor on an electrical power supply, and it is an energy storage device too.

Then the flow goes into a servo valve 209, which is often implemented as a four-way valve. Typically, servo valve 209 includes a spool valve 210 as the main stage. The servo valve itself ordinarily is actually a three-stage valve, and a small torque motor operates a small flapper valve. It takes very little current to cause this torque motor to move for in turn moving the flapper valve. When it moves (maybe you get a quarter of a gallon per minute for the maximum flow out of that), and that flow then goes into a small spool valve, another four-way valve. So, there is some hydraulic amplification. Then the output of the two-stage pilot valve is probably about a five gallon per minute peak flow. That flow then moves the ends of a third stage. It drives the main stage spool back and forth. So, as the valve moves back and forth, it is a proportional valve and it basically acts like a giant resistor. Since it is a four-way valve, it acts similar to a four-armed bridge circuit with a resistor at each arm of the bridge and the load connected across the horizontal nodes of the bridge. In this instance, the hydraulic power supply is connected across the upper and lower junctions in this bridge.

The flow that comes from the servo valve mainstage 210 is used to drive the reaction mass 218. Let us assume that the servo valve mainstage spool 210 is in such a position that the high pressure is ported through the "Upper Passage" in FIG. 2 and into the upper chamber of the mass 218. That flow then causes the mass 218 to accelerate upwards and at the same time there is an equal and opposite reaction force that goes to the piston that is inside the hydraulic actuator that is connected to a baseplate 211 that is in contact with the earth (e.g., which is the same as baseplate 12 of FIG. 1), and then pushes on the earth creating the desired seismic energy. A hold-down system (not shown) is applied to the baseplate 211 to maintain good contact of the baseplate 211 with the earth while it is dynamically driven. At the same time that the valve 210 is open to the upper chamber, it also connects to the lower chamber of the reaction mass through the "Lower Passage" in FIG. 2 to the return pressure. If the upper chamber is pressurized, the mass 218 moves up and the exhaust flows out of the lower chamber. This is commonly referred to as a double acting cylinder, and the reaction mass 218 effectively acts like a double acting cylinder. The fluid 203 exiting through the lower chamber returns back through the servo valve 210 and then eventually goes back to the pump 202.

Accordingly, for the servovalve spool position shown in the example of FIG. 2, the flow drives the reaction mass (MR) 218 upward thereby creating a reaction force that is applied to a piston that is coupled to the earth through the baseplate (MB) 211 and driven structure. At the same time, the fluid 203, which is metered into the upper chamber, exits from the lower chamber back through the servovalve main stage 210 and returns to the pump intake. Thus, the servovalve 209 offers proportional control and meters the working fluid 203 as it enters and exits the hydraulic actuator. (The pilot stage of the servovalve 209 is not depicted.)

A low pressure accumulator 212, as well as a low pressure filter 213, and oil cooler 214 are also typically included in that return path. There is also a reservoir tank 215 that holds the hydraulic fluid 203. Because these cylinders are designed to last many, many, millions of cycles, seals typically will not hold up with that kind of usage, particularly since the seals are trying to seal against fairly high pressures. So, things are generally not hermetically sealed, so to speak, and so usually the ends of the mass actuator are ported back to the reservoir tank 215. There are generally some wiper seals or bushings on the ends of the mass such that this leakage flow is ported back to the reservoir tank 215 at atmospheric pressure, where the seals only have to seal against the atmospheric pressure. There is a small prime pump (or "make-up pump") 216 that is typically driven by an electric motor 217, to supply fluid from the tank 215 to the return side in the inlet of the main pump 202, which makes up for the above-mentioned leakage.

The hold-down force is typically provided by the vehicle weight and is applied through a system of airbags. The airbags isolate the vehicle frame (e.g., of the truck 17 shown in FIG. 1) from the baseplate 211 usually for frequencies at and above about 2-Hz. The resulting contact force at the baseplate/earth interface, called ground force, is the signal most commonly used to represent the system output, with the polarity convention that a positive ground force indicates compression.

Ground force is typically approximated using the mass weighted sum of the reaction mass and baseplate accelerations. In the absence of shear stress at the contact surface, the far-field particle displacement downhole, due to P-wave radiation from an acoustically small disc vertically oscillating at the surface, in the theoretical world of elastic isotropic half-spaces, has the same spectral shape except for time delay as the ground force. For small sources, it can be shown that the distribution of the vertical stress applied over the contact area need not be uniform and that the same relationship holds between the resulting ground force and far-field particle motion. Geophones velocity transducers), such as those shown as $D_1$-$D_4$ in FIG. 1, are generally used as receivers.

Thus, in an elastic isotropic homogeneous half-space far-field particle velocity or pressure due to the radiated compression wave is proportional to the time derivative of the applied vertical force except for time delay, and inversely proportional to the distance traveled. In most cases the best we can do is to maintain a flat force output that is below the hold-down force applied. For the case of a linear sweep, we would expect to see a +6-dB/octave rising spectrum in measured particle velocity or +12-db/octave rising spectrum if accelerometers are used as receivers, but in reality the earth is not elastic and absorption attenuates these high frequencies very quickly.

The spring/dashpot 220 shown in FIG. 2 form a simple half-space model of the earth radiation impedance when working on hard surfaces. A more complete model for the earth, particularly when working on mud or sand, might include an effective captured ground mass. For a layered medium, the radiation impedance model becomes much more complicated, where the vibrator "sees" the effect of shallow reflectors and this too affects the driving point impedance. In the real world, where baseplate support is not even and the medium is neither homogeneous nor linear, coupling issues can add considerable complexity to any model of impedance. Other major components not fully shown in FIG. 2, but which are well known to those of ordinary skill in the art, include the hold-down/lift/isolation system, mass-centering suspension and driven structure. Inclusion of the electronic feedback control and telemetry system (not discussed in detail herein, but which are well known to those of ordinary skill in the art), complete the picture.

Seismic vibrators in use today, such as the exemplary hydraulic seismic vibrator represented by FIG. 2 discussed above, have constraints that impose frequency-variant limits on their output amplitude spectrum. That is, operational constraints, such as mechanical and hydraulic constraints of the hydraulic vibrator, impose frequency-variant limits on the output amplitude spectrum achievable by the hydraulic vibrator. These constraints include but are not limited to: reaction mass stroke, maximum deliverable pump flow, hold-down weight, servo-valve response, available supply pressure, and the driven structure response. The problem is compounded by other effects like absorption of high frequency energy and environmental noise. While a conventional linear sweep may work well enough to image the subsurface given enough sweep time, it may not provide the most economical solution especially if it requires the use of very long sweep times or many shots at a particular location.

Figure 3:
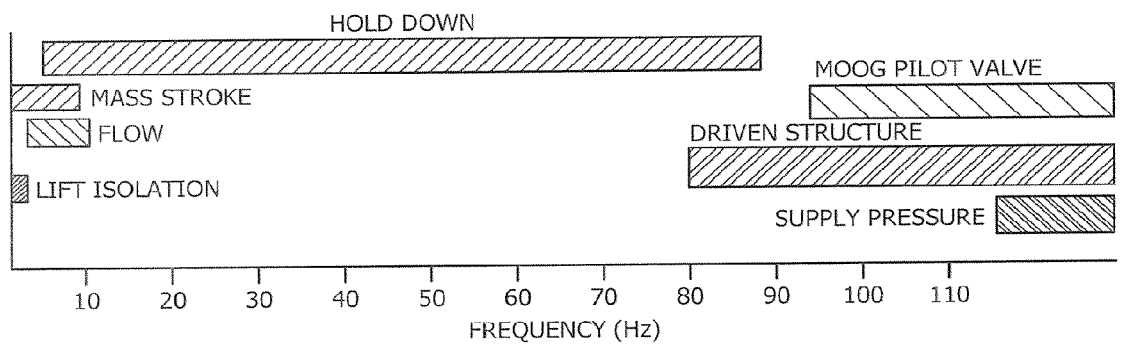
FIG. 3 shows a graph illustrating the various constraints and the frequency bands over which they may be the determining factor, governing how much force can be realized by a typical hydraulic seismic vibrator device.

FIG. 3 shows a graph illustrating the various constraints and the frequency bands over which they may be the determining factor, governing how much force can be realized by a typical hydraulic seismic vibrator device. That is, FIG. 3 illustrates the constraints imposed by the typical hydraulic seismic vibrator's hydraulic and mechanical system, and shows at what frequency range(s) each constraint typically compromises the force output amplitude achievable by the seismic vibrator. As shown in FIG. 3, such constraints imposed by the seismic vibrator's hydraulic and mechanical systems that may govern how much force can be output by the seismic vibrator over different frequency ranges may include fluid flow, lift isolation, mass stroke (or "displacement"), hold down, pilot valve, driven structure, and supply pressure. These constraints can be important to consider when designing sweeps for practical implementation. These constraints and further details regarding how they affect the output response are described below.

Flow Constraints of the Hydraulic Circuit

Figure 4A:
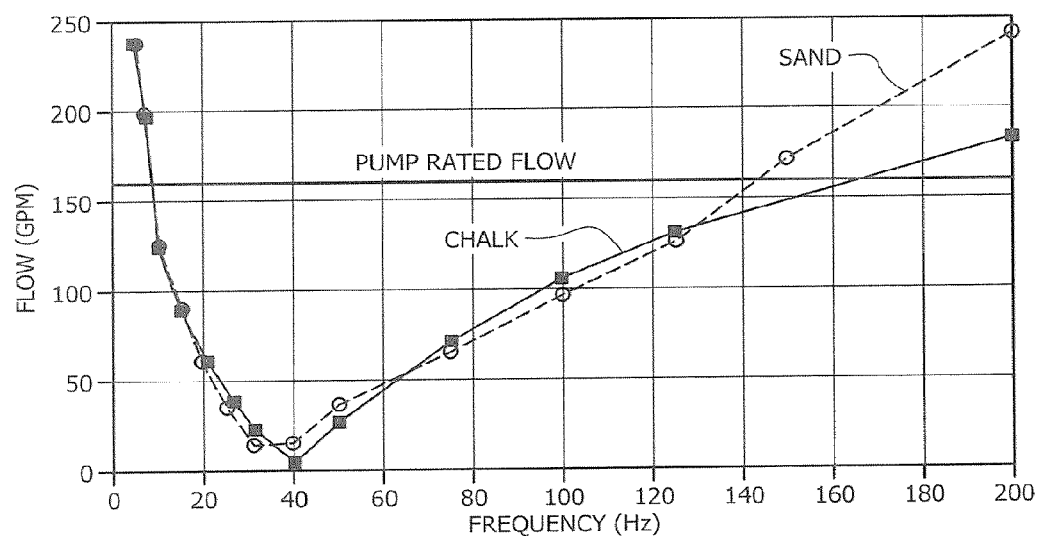
FIG. 4A shows a graph illustrating the theoretical working fluid flow demand versus frequency for an exemplary seismic vibrator (referred to as "Model A") while producing a constant fundamental output ground force of 45,000 pounds.
Figure 4B:
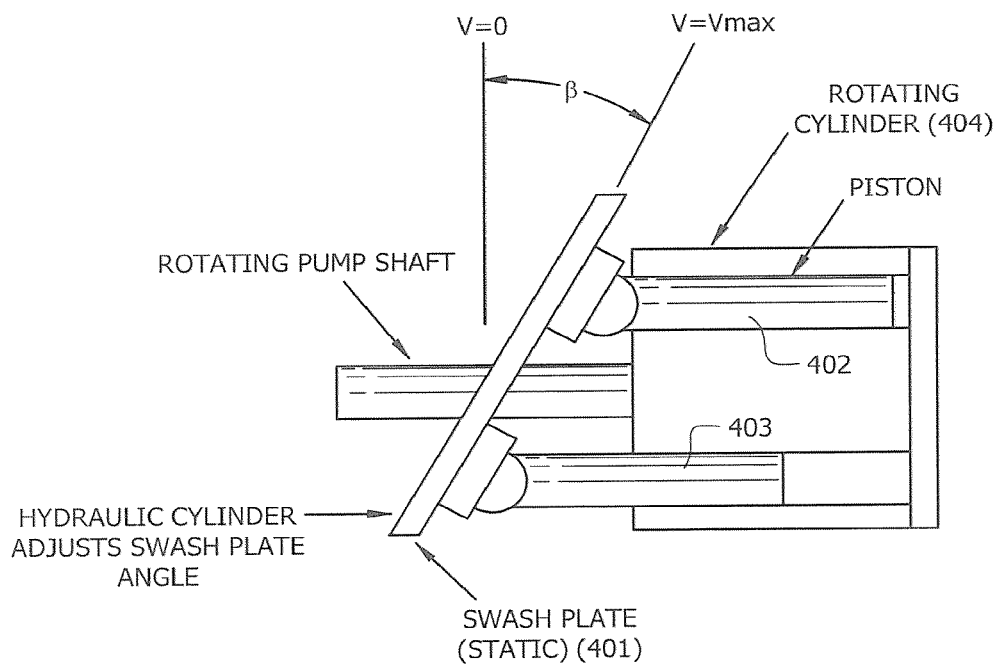
FIG. 4B shows a cutaway view of a pressure compensated variable displacement axial piston pump.

FIG. 4A shows a graph illustrating the theoretical working fluid flow versus frequency for an exemplary seismic vibrator, referred to herein as "Model A," such as that equipped with a pump like that represented in FIG. 4B. The theoretical working flow refers to the flow that an ideal pump of infinite capacity and perfect pressure regulation would have to provide to meet the load requirement of the vibrator while maintaining the prescribed target force. FIG. 4A shows this flow for a vibrator operating on sand or chalk when delivering a constant fundamental-peak ground force output of 200-kN (45000 pounds) for a 5-200 Hz sweep subject to a raw peak force limit of 267-kN (56000 pounds) corresponding to 90 percent of hold-down. The overall raw peak force limit of 267-kN in this example is to ensure that the baseplate does not completely decouple from the ground.

At low frequency due to harmonic distortion, the raw ground force signal tends to look like a triangle wave, the implication being the fundamental output falls below 200-kN for frequencies less than 15-Hz, since the peak force levels approach the 267-kN threshold. So, for example, on sand at 10-Hz the ground force waveform may have a raw peak value of 267-kN, with a fundamental peak value of only 155-kN. The peak flow demand ranges from close to 946-l/min (250-gpm) at low and high frequencies to less than 57-l/min (15-gpm) at resonance (low points on the curves of FIG. 4A). That vibrator pump only has a rated flow of 605 l/min (160-gpm) (as indicated by the "Pump Rated Flow" line in the graph of FIG. 4A) and this imposes a constraint particularly for low-frequency dwell sweeps (where, as shown in the graph, the flow demand exceeds this constraint). Above this resonance, flow demand increases with frequency primarily due to the compressibility of the hydraulic fluid. A lot of flow is wasted "squeezing the fluid" rather than moving the reaction mass and driven structure. As frequency increases the rate of this cyclical compression of the trapped fluid volume increases creating a higher flow demand with more power wasted as heat.

Because pumps are flow devices and the engine RPM is constant, in order to maintain a constant pressure the volume of flow delivered per revolution must change. FIG. 4B shows an exemplary representation of a typical pump interior (e.g., an exemplary implementation of a pump 202 of the exemplary seismic vibrator hydraulic circuit of FIG. 2). The pump's flow output is changed as the swash plate 401 is tilted to vary the maximum displacement of each piston 402, 403 in the pump per revolution. The swash plate 401 is controlled by a hydraulic cylinder 404 inside the pump. The pump has its own closed-loop-feedback system. As flow demand increases, the system pressure falls. The fall in pressure causes a hydraulic actuator to change the pump displacement via the swash plate 401 to increase flow and thereby build pressure. The response time of pumps to changes in demand varies with manufacturer from between 100-700 ms to go from no flow to rated flow and between 35-50 ms to go from rated flow to no flow. So, pumps in use today on large seismic vibrators are not fast enough to respond to rapid fluctuations in demand that can occur within certain designed sweeps. Accumulators, such as accumulator 208 of FIG. 2, help to maintain system pressure when flow transients occur.

As mentioned above, there is an increasing interest in increasing the low-frequency content of sweeps. One constraint that is often taken into account is the mass stroke (or "displacement"), which limits the force that can be generated at low-frequency before the mass hits its stops.

As discussed herein, another limit is the pump flow (or "fluid flow") of a hydraulic seismic vibrator device. For most vibrators in use today, pumps are incapable of delivering adequate flow for long-dwell-low-frequency linear sweeps even at reduced drive levels. This flow limit typically comes into play if the dwell-time for a frequency below about 8-Hz exceeds 2-s and the vibrator is being driven near its maximum achievable output. This guideline is based on an assumption that most large vibrators have typically 10 to 20-liters of high pressure accumulator capacity, let's assume 15-liters. If the pump supplies a maximum average flow of 10 liters/s and generation of 6-Hz requires an average flow of 13-liter/s, the flow deficit is 3-liter/s that must be supplied by the accumulators. One might think that such a system can operate for 5-s without running out of hydraulic fluid (or "oil") (15-liters/3-liter/s), but because the system pressure falls as the accumulators are depleted, the system is not left with adequate supply pressure to maintain the high target force and most likely the result will also create lots of distortion. To be safe, operators generally prefer to avoid flow demands that exceed pump capacity for more than 2-s. The first symptom one encounters is the inability to maintain system pressure throughout the sweep or an alert of valve overtravel.

Thus, reaction mass stroke and pump capacity can limit low frequency output. Thus, an approach that takes into consideration only the reaction mass stroke (or displacement), as in the MD method discussed further below, is insufficient. Accordingly, certain embodiments of the present invention, as discussed further below, provide a unified approach that takes into consideration multiple constraints, such as flow and reaction mass stroke in designing a sweep (e.g., a non-linear sweep) for achieving a target output spectrum. Under some simplifying assumptions, some conservative estimates for the peak fundamental force that can be determined subject to both flow and stroke constraints can be developed. The underlying assumption is that at low-frequency (less than 10 Hz) the reaction mass moves much more than the baseplate and so the baseplate motion can be ignored. (See formula box, "Formula Box 1," below.)

Formula Box 1

Some low frequency constraints (sinusoidal operation below 10-Hz).

Mass displacement limit constraint $Hz_{DL}$ is the lowest frequency at which a peak fundamental force $F_{pk}$ (N) can be achieved. $M_r$ is the reaction mass size (kg). (Baseplate motion is ignored.)

$$Hz_{DL} = \frac{1}{2 \cdot \pi} \cdot \sqrt{\frac{2 \cdot F_{pk}}{Stroke_{useable} \cdot M_r}} \quad (1)$$

Equation (1) above can be put in a different form so tha peak fundamental force subject to the stroke constraint can be evaluated where Xmax equals one half the entire useable stroke:

$$F_{pk} = M_r \, Xmax \, (2 \cdot \pi \cdot f)^2 \quad (1a)$$

Pump flow constraint

Average pump flow demand = $(2/\pi) A_p$ (Peak Reaction Mass Velocity)

$A_p$ is the piston area (m²). $Stroke_{useable}$ is the reaction mass useable stroke (m). For low-dwell, low-sweep rates (<5 Hz/s) at low frequency, we need to ensure that we do not "sap the pump". A conservative estimate of how hard we can shake at low frequency (based upon a zero sweep rate) and a swept sine wave after converting to MKS (meters-kilograms-seconds) units:

$$F_{pk} < 9.87 \, M_r \, Hz \, (Pump\_flow\_rating)/A_p \quad (2)$$

Figure 5A:
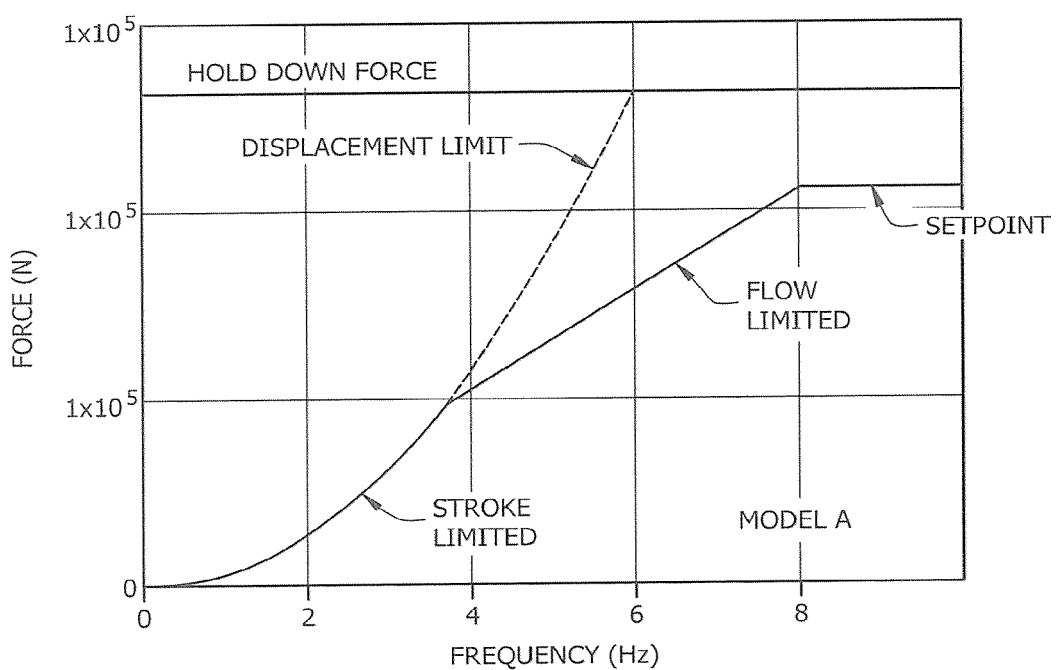
FIGS. 5A-5D show a resulting set of graphs that arise for exemplary seismic vibrator models, referred to as Models A-D, respectively, when solving for the maximum peak fundamental force under both the flow and displacement constraints.
Figure 5B:
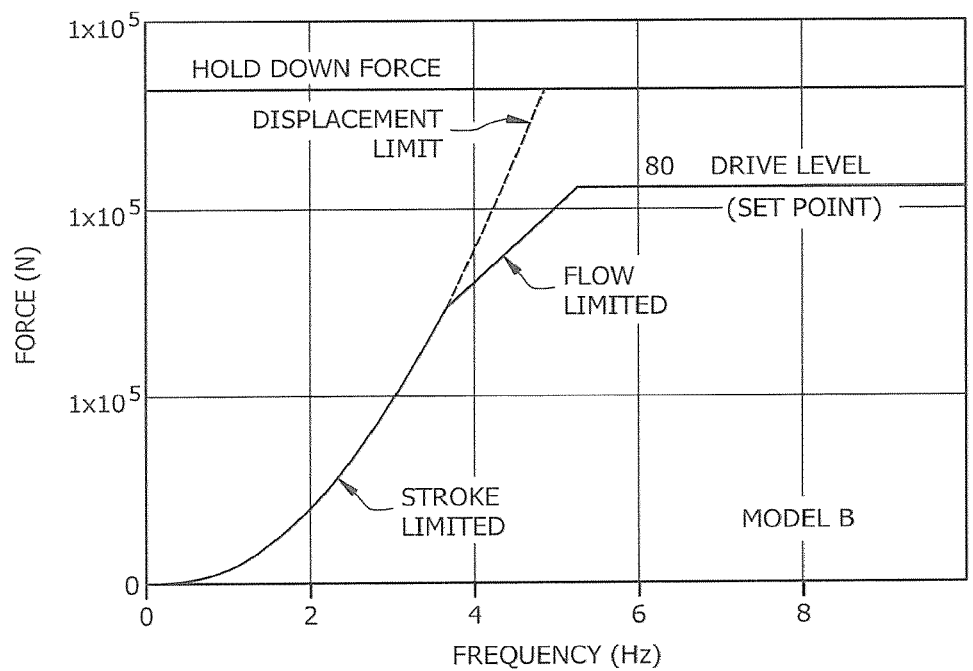
Figure 5C:
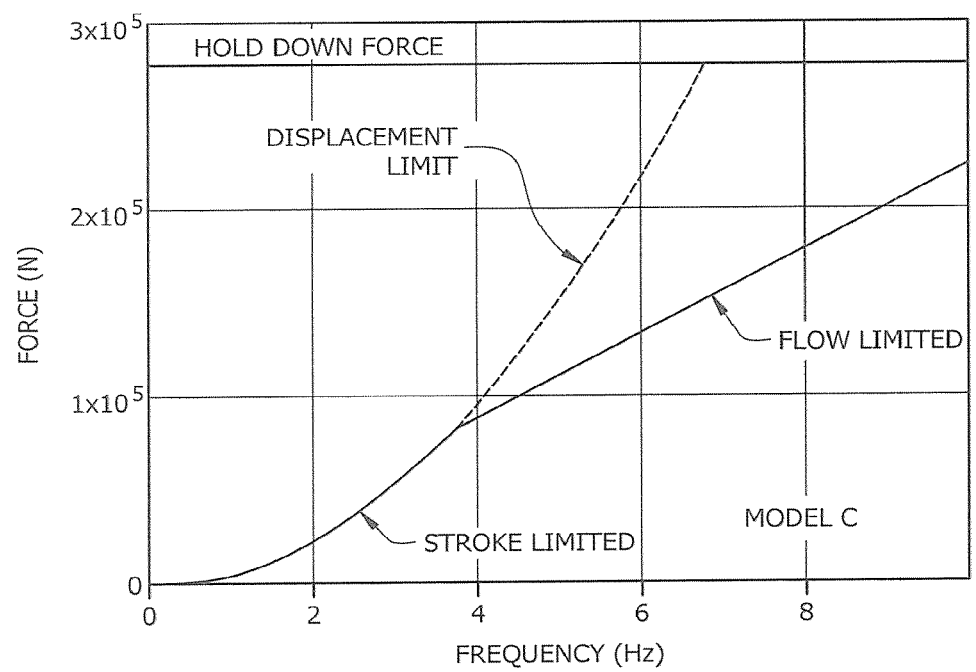
Figure 5D:
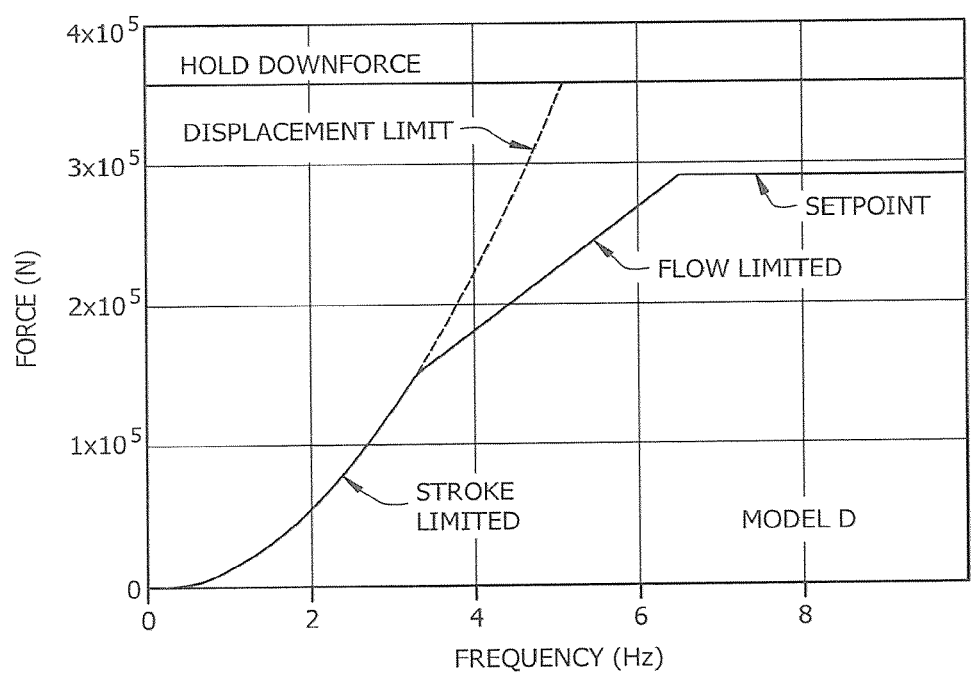

The flow and displacement constraints may be combined to solve for the maximum peak fundamental force ($F_{pk}$) a given hydraulic seismic vibrator device might be able to sustain under those constraints. FIGS. 5A-5D show a resulting set of graphs that arise for exemplary seismic vibrator models referred to herein as Models A-D, respectively, when solving for the maximum peak fundamental force under both the flow and displacement constraints. The vibrator specifications, which were used to determine curves in FIGS. 5A-5D are are shown in Table 1 below. So looking at FIG. 5A, the parabolic shaped dashed line represents the maximum force that can be realized due to a displacement limit. In this case, this displacement limit provides only an overiding constraint to output force form the range of zero to 3.8 Hz and this portion of the solid curve is labeled stroke limited. For frequencies above 3.8 Hz the displacement limit is no longer the dominate factor. So, looking again at FIG. 5A, the force output of the Model A vibrator might be constrained by pump flow over the range of 3.8-Hz to 8-Hz with this portion of the curve labeled as "FLOW LIMITED". As we move higher in frequency to above 8 Hz the overiding limiting factor is the force "SET POINT" that the user has selected that corresponds to the maximum force output to be employed in the sweep. The Model B with the same pump, same piston area, and a larger mass is limited by flow over the range of 3.8-Hz to 5.3-Hz, but is capable of generating considerably more force over that band of frequencies than the Model A, as illustrated in FIG. 5B.

TABLE 1

| Model | $F_h$ (N) | $M_r$ (kg) | $A_p$ (m$^2$) | Stroke$_{useable}$ (m) | Pump_flow_rating (m$^3$/s) |
|---|---|---|---|---|---|
| Model A | 266900 | 3691 | .01329 | .1020 | .01009 |
| Model B | 266900 | 5696 | .01329 | .1020 | .01009 |
| Model C | 278000 | 4082 | .01334 | .0762 | .00763 |
| Model D | 356000 | 7000 | .01570 | .1020 | .01055 |

Exemplary Sweep Creation Systems and Methods According to Certain Embodiments of the Present Invention To some extent nonlinear sweeps, and in particular low-dwell sweeps, can be designed to compensate for the lack of output force that can be achieved at low frequencies. A brief discussion of the constraints imposed by the vibrator response in combination with earth absorption of high frequency energy and illustrates how nonlinear sweeps could be designed to help compensate for both the vibrator and earth response is provided in Anstey. N. A., 1991. *Vibroseis*, Prentice Hall, Englewood Cliffs, N.J., 114-124. As was mentioned earlier, because the earth is not a pure elastic medium (aborption can quickly eat up high frequency gains) and due to economic constraints, the boost in spectral content afforded by the use of nonlinear sweeps can be quite limited. Rietsch (1977a, 1977b) derives the relationship between the sweep rate and power spectrum in: Rietsch, E., 1977a, Computerized analysis of vibroseis signal similarity, *Geophysical Prospecting*, 25, 541-552, the disclosure of which is hereby incorporated herein by reference. Rietsch then presents a recursive algorithm for creating nonlinear sweeps with a desired target spectrum in: Rietsch, E., 1977b, Vibroseis signals with pre-scribed power spectrum. *Geophysical Prospecting*, 25, 613-620, the disclosure of which is hereby incorporated herein by reference.

More recently, Bagaini et al (U.S. Pat. No. 7,327,633) propose a method referred to as (Maximum-Displacement or "MD" sweep design), which takes into account some vibrator constraints to deliver a user defined ground-force spectral density (or "a desired target output spectrum"). The MD sweep design considers two basic constraints at low-frequency: mass displacement and harmonic distortion content (the harmonic distortion is empirically determined in the MD method and will generally be a function of: 1) drive level; 2) earth coupling; and/or, 3) vibrator control electronics). The MD method will tend to overestimate force that can be realized when low frequencies must be sustained due to the fact that the vibrator pump is unable to meet the flow demand of sustained low frequencies. A method referred to herein as SFC (Stroke Flow Constrained sweep) can be determined for generating a low-dwell sweep that enables the low-frequency energy to be increased.

We now briefly discuss this SFC method, as well as how one might compensate for the vibrator response in such method. Assume that: "f" represents the instantaneous frequency (Hz) in the sweep, "$F_{target}(f)$" represents the target source spectrum (N), "$F_{constraint}(f)$" represents the maximum force constraint (N), for a given sweep length SL (s) with start and end frequencies F0 (Hz) and F1 (Hz) respectively we find the modified instantaneous sweep rate "SR(f)" (Hz/s) will be:

$$SR(f) = \beta [F_{constraint}(f)/F_{target}(f)]^2 [F1-F0]/SL \quad (3).$$

The parameter "$\beta$" is a constant of proportionality that will be a function of the deviation away from a conventional linear sweep that is to be employed. In certain embodiments, a sweep generator device includes logic that employs the above equation (3) so that it modifies the sweep rate to be used in a sweep that it is generating in order to determine a sweep that achieves a desired target output spectrum in compliance with at least the fluid flow and mass displacement constraints of a given hydraulic seismic vibrator device. The sweep rate for a particular frequency is related to a constant of proportionality (i.e., "$\beta$") times whatever the constraint is determined to be at that frequency (which may be determined as a minimum of various equations for determining a plurality of different constraints, such as those shown in FIG. 3, which may be determined via equations discussed further herein and/or otherwise known in the art), divided by the target spectrum squared, then multiplied by a scale factor (e.g., F1 might be the end frequency and F0 the start frequency of a sweep), then divided by the length of time of the sweep, i.e., the sweep length (SL).

The constant of proportionality, "$\beta$," is generally not known at the outset of determining the sweep by the sweep generator. One technique for determining $\beta$ is to run this program twice. In the first run, $\beta$ may be set to a given value, say $\beta=1$. Then, based on an evaluation of the result of the first run, it may be determined at which time the end frequency is reached in the sweep that is being generated, and that time is noted (e.g., stored to memory). Then, because it may be known at the outset that a sweep of a certain sweep length is desired, the ratio of what the noted time is to the desired sweep length may be determined, and then $\beta$ is multiplied by that ratio to determine the value of $\beta$ for the second run of the program. Then, the resulting sweep determined in the second run will produce the desired result. Of course, in other embodiments, the value of $\beta$ to be used may be predetermined in any other suitable way.

So, basically, the sweep generator device of one embodiment uses the above equation (3) to determine the sweep rate versus frequency, in order to produce a non-linear sweep rate that can be employed on a specified hydraulic seismic device to achieve a target profile of the output spectrum desired in compliance with constraints (e.g., the fluid flow and mass displacement constraints) of the hydraulic seismic device.

It should be noted that sweep rate is the derivative of instantaneous frequency, and frequency is the time derivative of the instantaneous phase. So, in order to generate a sweep, the instantaneous phase is needed. Basically, the instantaneous phase is the double integral of the sweep rate. So, the instantaneous phase may be determined, which may include some offset. For instance, a user may not want to start at zero phase, and so a phase offset may be added, such as an offset of 90 degrees ($\pi/2$ radians). So, the sweep generator device may then numerically double integrate the sweep rate versus frequency curve to create an instantaneous phase curve. Then, the sine of that instantaneous phase curve may be determined to result in a pilot or reference signal to be downloaded (or otherwise input) to the control circuitry of the hydraulic seismic vibrator device, and be used to generate the sweep to be performed by the vibrator device.

In certain embodiments, the sweep generator may modify the very ends of the sweep a little bit through use of a taper of some kind, such as a cosine taper on the ends, just to avoid having an abrupt start or stop. That taper could also be implemented in the frequency domain. For instance, this taper function may be input as part of the desired target output spectrum, where the frequency sweep accounts for the desired taper.

Figure 6:
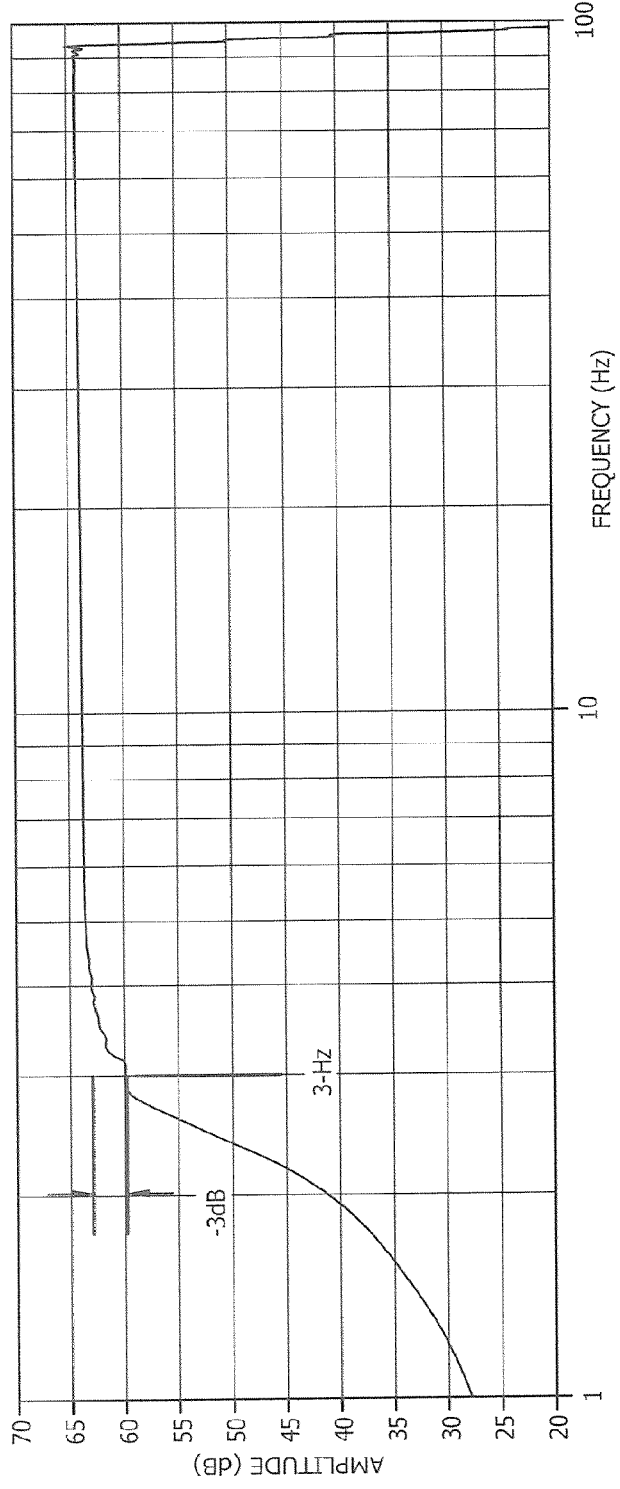
FIG. 6 shows an example SFC (stroke and flow constrained) nonlinear sweep subject to stroke and flow constraints designed for the case of an exemplary vibrator "Model A" according to one embodiment of the present invention.
Figure 6:
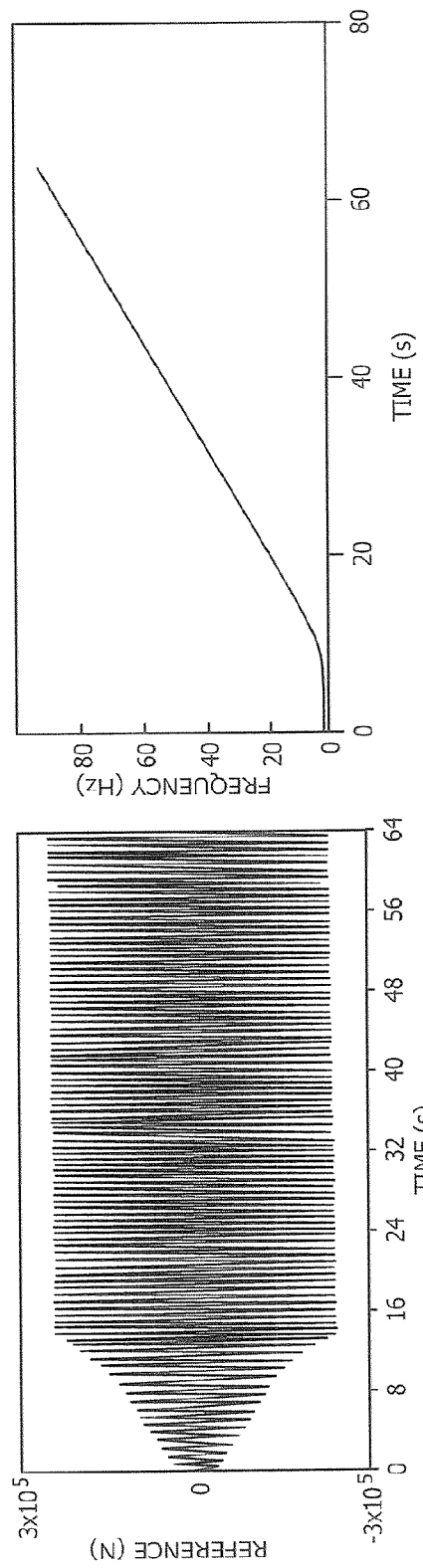

An example SFC sweep designed for the case of an exemplary Model A vibrator is shown in FIG. 6. One thing to note, all things being equal, a heavier reaction mass will greatly reduce the dwell-time needed to build up the low-frequency end of the spectrum. In other words, if one vibrator needs to spend 25% of the sweep below 10-Hz to build up the low-frequency sweep energy, and that vibrator is replaced with another vibrator of identical design but with a reaction mass say 30% heavier, this will reduce the necessary total low frequency dwell-time down to about 15% of the total sweep time. This is because by increasing the mass weight, the vibrator can effectively shake 30% harder than before in the region where the first vibrator was constrained.

The three-stage-proportional-control four-way servovalve, such as discussed above with the example of FIG. 2, is the most common flow control device in use today. A pilot valve through a torquemotor converts the vibrator electronics to hydraulic flow and drives the main-stage spool. The main-stage spool directs flow into the actuator chamber thereby accelerating the mass to generate the force required to move the baseplate and the earth to which it is coupled. Most vibrators today use Moog "high-frequency" servovalve pilots that were first introduced in the 1980's. These pilot valves have an 18.9 liter/minute flow rating.

Today, as a push is made toward higher frequencies with stiffer baseplate designs, the drive flow provided by the conventional pilot valve can be insufficient to fully open the mainstage spool at frequencies above 100-Hz. This problem becomes apparent during high-frequency operation when the vibrator electronics warns that the torquemotor current exceeds the manufacturer's rating. In the past, because the weighted sum estimate overestimated the ground force, the controller did not really drive the vibrator as hard as it should at high-frequency. The weighted sum signal the controller uses for comparison with the reference signal match spectrally, but in reality the "true ground force" amplitude was falling off dramatically above 100-Hz.

Figure 7A:
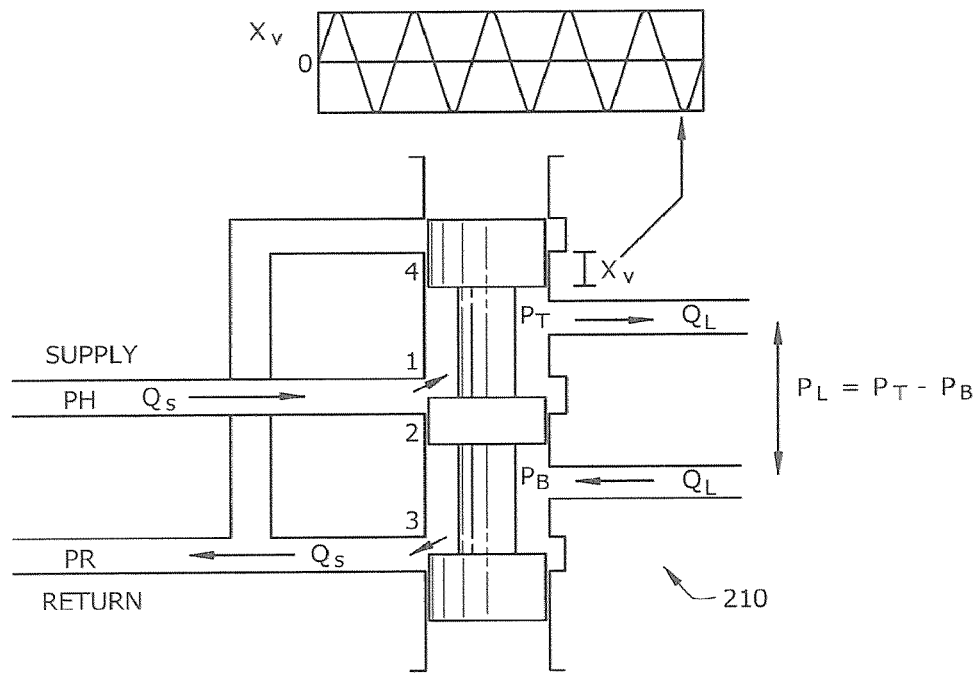
FIG. 7A shows an exemplary servovalve main-stage (as implemented in the exemplary hydraulic seismic vibrator of FIG. 2)
Figure 7B:
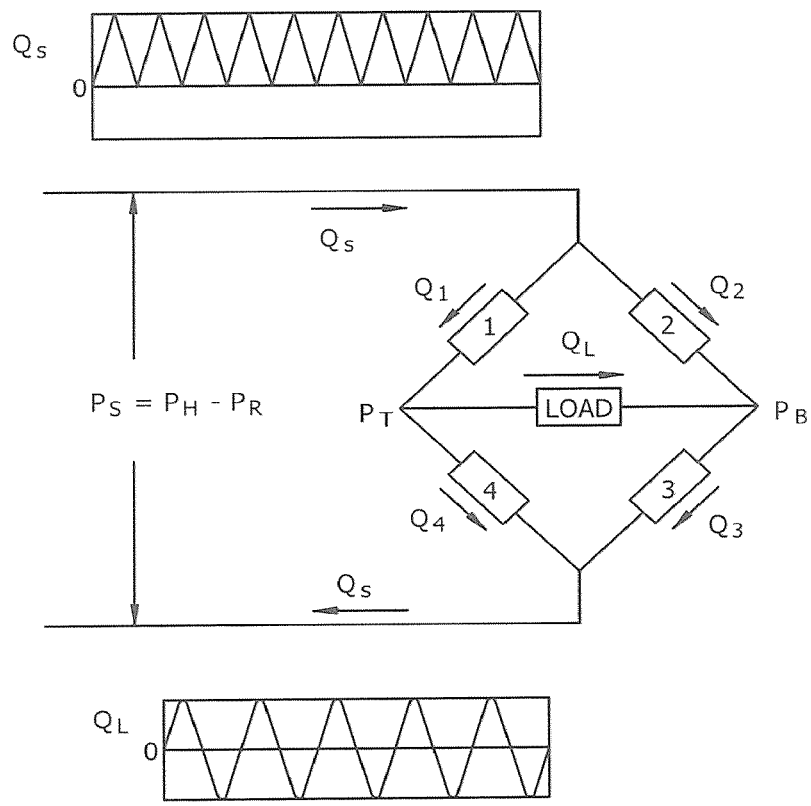
FIG. 7B shows a corresponding schematic representation of the servovalve main-stage of FIG. 7A as a bridge circuit.

The relationships between valve opening, flow and the pressure drop across the metered orifices is nonlinear giving rise to much of the odd harmonic distortion commonly seen in the field. FIG. 7A shows an exemplary servovalve main-stage 210 (as implemented in the exemplary hydraulic seismic vibrator of FIG. 2), and FIG. 7B shows a corresponding schematic representation of the servovalve main-stage of FIG. 7A as a bridge circuit. The nonlinear relationships between flow (Q) and pressure drop (P) across each orifice appear at the right in equations 4 thru 7.

$$Q_1 = C_d \cdot A_1 \cdot \sqrt{\frac{2}{\rho} \cdot (P_H - P_T)} \quad (4)$$

$$Q_2 = C_d \cdot A_2 \cdot \sqrt{\frac{2}{\rho} \cdot (P_H - P_B)} \quad (5)$$

$$Q_3 = C_d \cdot A_3 \cdot \sqrt{\frac{2}{\rho} \cdot (P_B - P_R)} \quad (6)$$

$$Q_4 = C_d \cdot A_4 \cdot \sqrt{\frac{2}{\rho} \cdot (P_T - P_R)} \quad (7)$$

$P_H$, $P_R$, $P_T$, and $P_B$ represent respectively the supply high pressure, supply return pressure, pressure in the upper chamber of the actuator and the pressure in the lower chamber of the actuator. $C_d$ represents the discharge coefficient for a sharp edged orifice which is assumed to be identical for all parts of the four-way mainstage valve. The terms $A_1 \ldots A_4$ are the effective area of the orifice formed between each spool land and the sleeve slot. The slots are rectangular so that the orifice area changes linearly with spool position $X_v$, but because the valve acts like a bridge circuit, if leakage terms are ignored, only two areas are active at a time. So for example when $X_v$ is positive (spool is down in FIG. 7A) only orifices 1 and 3 are active and the area for orifices 2 and 4 is effectively zero.

If the servovalve is critically lapped, completely symmetric with no leakage, and the reaction mass is supported by a suspension system so that the average pressure in the upper chamber and lower chamber of the mass are the same, the equations 4-7 reduce to equation 8, where "k" is the flow gain constant. Because the pressures inside the actuator chambers are dynamic and not independent variables this equation is not sufficient to define the actuator output. It is one of several coupled equations that relate flow and actuator pressures.

$$Q_L = k \cdot X_V \cdot \sqrt{(P_H - P_R) - \frac{X_V}{|X_V|} \cdot (P_T - P_B)} \quad (8)$$

As we move higher in frequency, the compressibility of the hydraulic fluid becomes an important factor. This causes an increase in flow demand, but at the same time the differential pressure in the actuator is high and approaches the supply pressure. This means there is no pressure left to drop across the servovalve to provide the necessary flow. In some vibrator controllers this is flagged as an "overpressure" condition. This too is a limiting factor on high-frequency operation.

In one embodiment, a vibrator output force constraint profile may be determined which accounts for a plurality of different constraints, such as fluid flow (or "pump") constraint, mass displacement constraint, and possibly other constraints, as examples. In one embodiment, the combined vibrator output force constraint profile can be expressed mathematically as a function of frequency by an expression of the form:

$$F\text{constraint}(f) = \min[F\text{disp}(f), F\text{pump}(f), F\text{valve}(f), F\text{set}] \quad (9).$$

In this example, the combined vibrator output force constraint, Fconstraint(f), is determined as the minimum of the output force constraint imposed by the mass displacement (i.e., Fdisp(f)), the output force constraint imposed by the fluid flow or pump (i.e., Fpump(f)), the output force constraint imposed by the servo valve i.e., Fvalve(f)), and the desired maximum force setting (i.e., Fset). It is recognized that one could easily modify equation 9 to include environmental constraints. For example, the addition of another term Fenviron(f) could be easily included as another argument in equation 9, where Fenviron(f) may impose a constraint on force output over a certain range of frequencies to avoid property damage or exciting resonance in a nearby structure.

Figure 8:
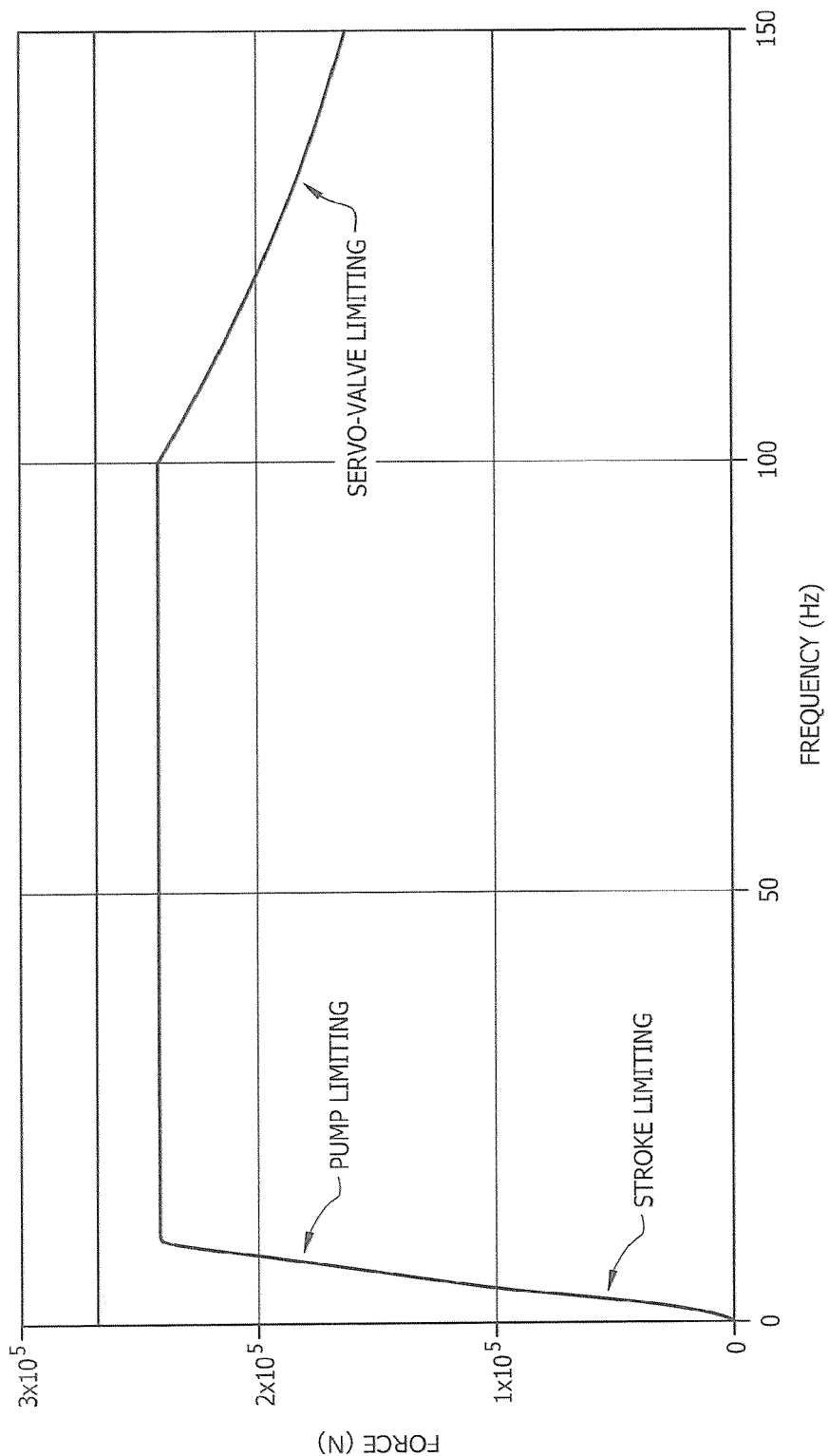
FIG. 8 shows the peak force constraints over a range of frequencies as determined by one embodiment of the sweep generator device for the specifications of an exemplary seismic vibrator "Model A"

When the above exemplary equation is employed by one embodiment of the sweep generator device for the exemplary Model A vibrator device specifications, the resulting peak force constraints over a range of frequencies as shown in FIG. 8 are determined, as are the following relationships:

$$F\max = 2.674 \times 10^5 \quad Q\max = 9.697 \times 10^{-3} \quad Fv := 90$$

$$Mr = 3.691 \times 10^3 \quad X\max = 0.051$$

$$F\text{disp}(f) := \min[F\max, [Mr \cdot X\max \cdot (f \cdot 2 \cdot \pi)^2]]$$

$$F\text{flow}(f) := 9.87 \cdot f \cdot Mr \cdot \frac{Q\max}{Ap}$$

$$F\text{valve}(f) := \text{if}\left(f > Fv, F\max \cdot \frac{Fv}{f}, F\max\right)$$

$$F\text{set} := 0.9 \cdot F\max$$

Fset is set to be 90% of the hold-down force, which is labeled as Fmax (Newtons) in the above example. It is often desirable not to operate at a maximum peak force that exceeds this amount because it can lead to decoupling of the baseplate from the earth and result in excessive harmonic distortion. Fdisp (Newtons) is the restriction imposed by the actuator stroke, where the term Xmax (meters) is set to one half of the peak-to-peak stroke. Fflow is the constraint imposed by the pump rating that is rated for a maximum of Qmax meters$^3$/second. Fvalve (Newtons) is the high frequency limitation imposed by the servovalve, in this case the corner was set at Fv=90 Hz.

Figure 9:
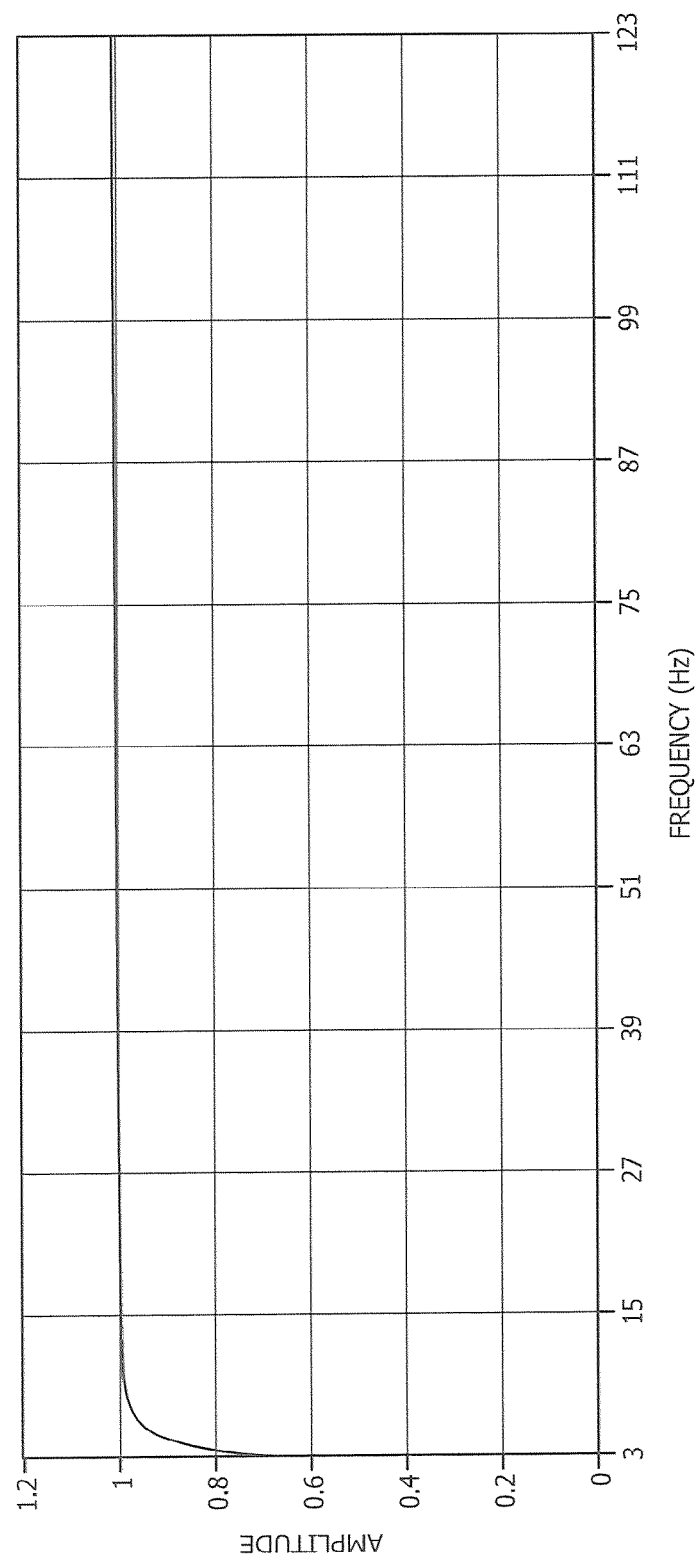
FIG. 9 shows an example of a desired target output spectrum, which in this example is shown as a flat spectral density on a linear scale over a range of 3-123 Hz, with a half-power point at 3-Hz.

According to certain embodiments, a target force profile (or "desired target output spectrum") may be received by the sweep generator device, and the sweep generator device may determine a sweep that may be employed by a given hydraulic seismic vibrator device to produce the target force profile in compliance with various constraints of the vibrator device, such as by complying with Fconstraint(f)=min[Fdisp(f), Fpump(f), Fvalve(f), Fset] described above, where "min [ . . . ]" is equal to the minima of the arguments. As one example, let us assume a flat force output amplitude spectrum is desired to be output by the vibrator, which is down only 3-dB at 3 Hz and choose not to compensate for the earth attenuation. An example of such desired flat three is shown graphically in FIG. 9. Further assume for this example that the desired sweep range is to go from 3 to 123 Hz and the desired sweep length is 20 seconds (or "20 s"). Again, FIG. 9 shows this example target spectrum.

According to one embodiment, a sweep generator device receives, as input, information defining the desired target output spectrum, and the sweep generator device determines a sweep that can be employed by the target hydraulic seismic vibrator device for producing the target output spectrum in compliance with various constraints of the vibrator device. As discussed above, the sweep generator device may find the modified instantaneous sweep rate "SR(f)" (Hz/s) as:

$$SR(f)=\beta[F_{constraint}(f)/F_{target}(f)]^2[F1-F0]/SL.$$

In one embodiment, a value for $\beta$ is selected (which may be determined as a result of a first run of the program, as discussed above), and the instantaneous frequency (shown below as "Hz" and expressed in Hertz) and instantaneous phase (shown below as $\phi$ and expressed in radians) for the sweep can be computed recursively as follows, where: "dt" is the time increment represented by each iteration, the index j=1 is the starting point, and j is incremented each iteration, and the recursion continues until $Hz_j$=F1 where "N" is set to the total number of iterations, and if the value of $\beta$ is chosen properly it follows that N·dt=SL. In other words, the product "j·dt" represents the time interval from the start of the sweep to step "j".

for $j=1, \ldots N$ $\phi_0=0$ $Hz_0:=F0$ $Hz_j:=Hz_{j-1}+dt·SR(Hz_{j-1})$ $\phi_j:=\phi_{j-1}+dt·[2·\pi·(Hz_{j-1}+Hz_j)·0.5]$ $S_j=W_j\sin(\phi_j)·Fconstraint(Hz_j).$ If the user chooses to implement some form of phase offset to the sweep instead of zero phase, one would set the initial phase to that value. In one exemplary embodiment, "dt" is set to 0.0005 seconds, to correspond to the Sercel VE432 format (a model of vibrator controller in wide use today). The VE432 is a digital controller and the instantaneous values of the sweep array "S" can be downloaded from the computer used to design the sweep into the VE432 memory where it is stored using a sample interval of "dt". Later when the vibrator is commanded to sweep, the vibrator controller uses the stored values of "S" as the reference or pilot signal. In certain embodiments, the sweep generator may add to the very ends of the sweep a little bit of a taper of some kind, such as a cosine taper on the ends, just to avoid having an abrupt start or stop—this term is represented by "W" used in the formation of "S" shown above.

Figure 10:
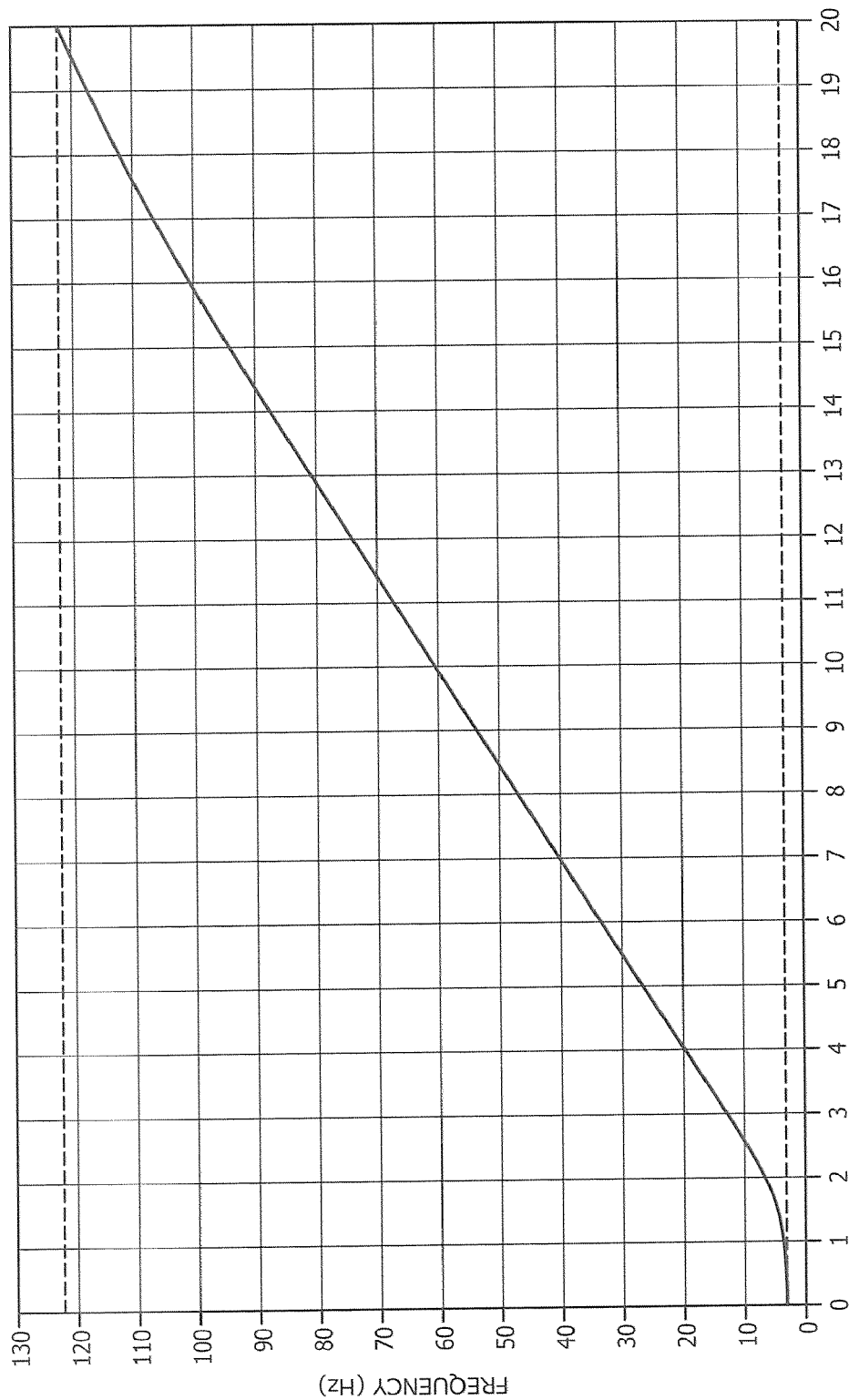
FIGS. 10 and 11 show graphs illustrating an example sweep designed for the case of an exemplary vibrator Model A in one exemplary application of an embodiment of the present invention.
Figure 11:
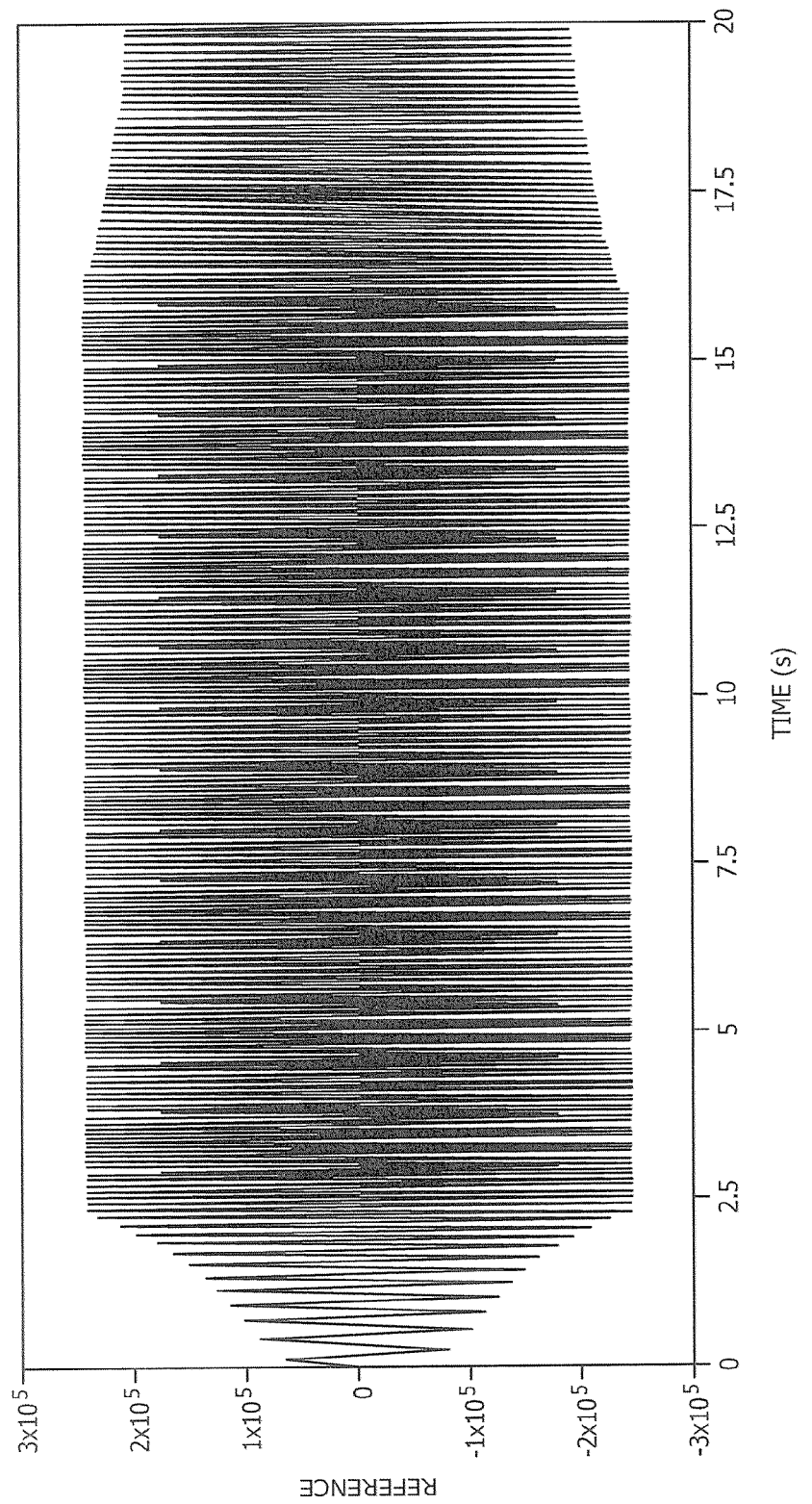
Figure 12:
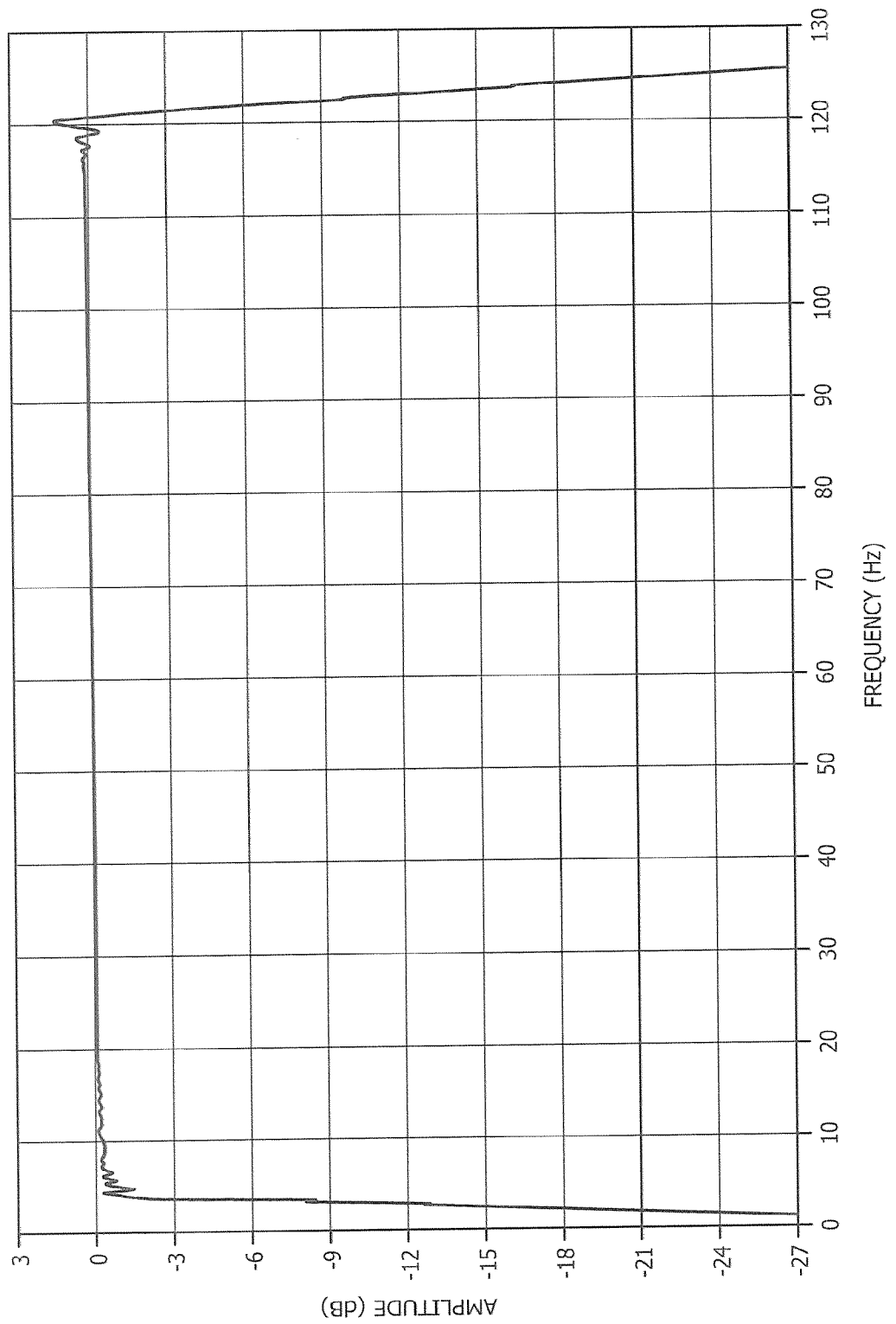
FIG. 12 shows the resulting amplitude spectrum.

As discussed above, the parameter "$\beta$" is a constant of proportionality that will be a function of the deviation away from a conventional linear sweep that is required. In this particular case being considered, $\beta$=1.38 produced a sweep of 20 s length that had the desired start and end frequencies. An example sweep designed for the case of an exemplary Model A vibrator is shown in FIGS. 10 and 11, along with the resulting amplitude spectrum shown in FIG. 12. Note: amplitude end tapers were applied to the reference each of duration 250 ms.

The force target profile can be easily modified to incorporate features designed to mitigate the earth absorption effects. For example, if the explorationist wants to boost the high frequency output to compensate for this loss mechanism, one could alter the target spectrum to for example incorporate a high frequency boost of 0.1 dB/Hz. As another example, one may alter the target spectrum to correct for things like ambient noise. For example, if there is a lot of cultural noise that falls in the 5 to 10-Hz region, one could choose to increase the target spectrum in that region thereby increasing the signal energy.

For the VE432 vibrator electronics, for example, usually the sweep design software is located on a laptop computer. There is a slot for a PCMCIA (Personal Computer Memory Card International Association) card in the laptop and also a slot for this card in the VE432. The reference sweep array is downloaded onto the PCMCIA card in the laptop. The memory device is removed and then plugged into the VE432 and resides there. The VE432 controller is connected to the vibrator system and upon command produces an electrical drive signal to drive the servovalve torquemotor. The output of the vibrator (usually ground force) is fed back to the controller where the vibrator output is compared to the reference signal and adjustments are made to the drive signal to compensate for the system response so that the vibrator output waveform matches the reference signal waveform as closely as system dynamics permit. Similarly, sweep design software of embodiments of the present invention may likewise be implemented in this manner, as an example.

Figure 13:
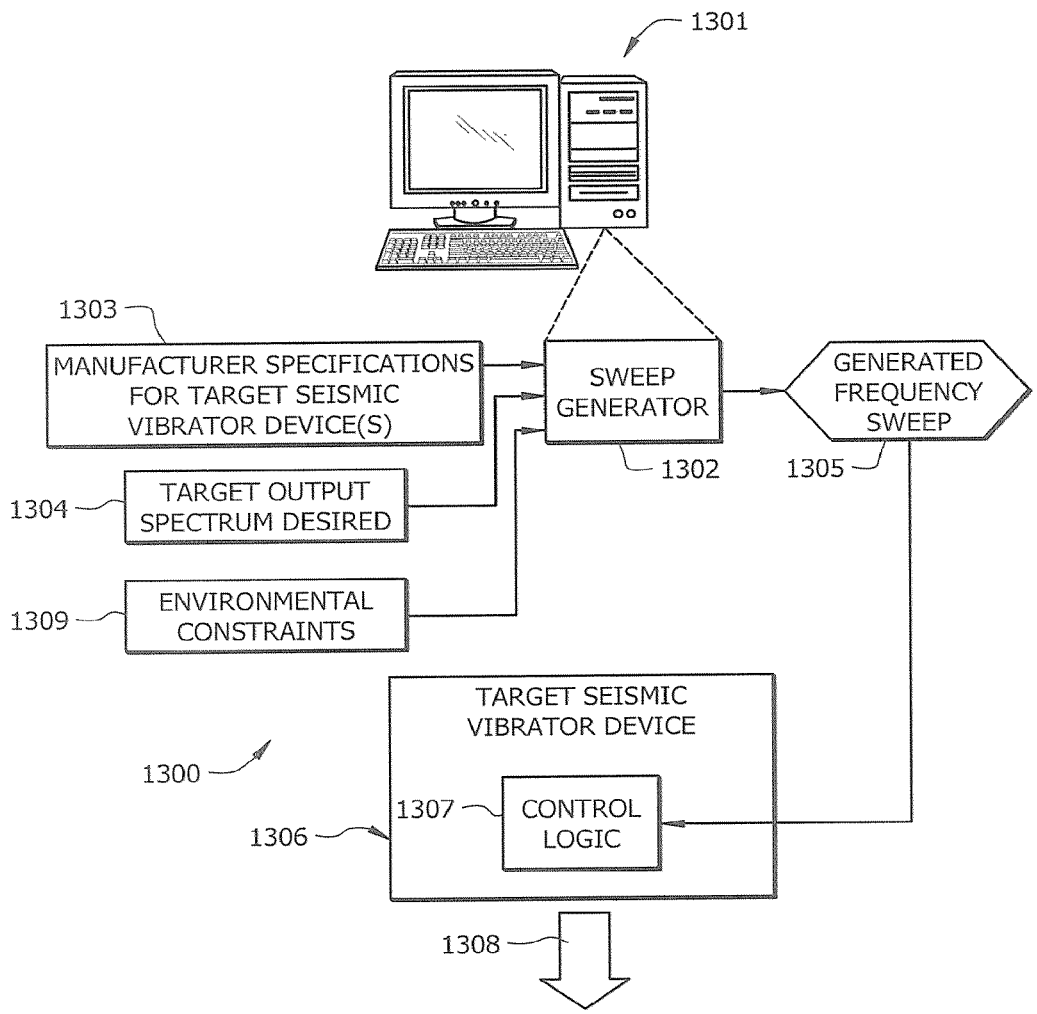
FIG. 13 shows an exemplary system according to one embodiment of the present invention.

FIG. 13 shows an exemplary system 1300 according to one embodiment of the present invention. System 1300 comprises a processor-based computing device, such as a personal computer (PC), laptop computer, server computer, workstation computer, etc. In this example, a sweep generator software application 1302 is executing on such a computer 1301. Accordingly, computer 1301 having sweep generator application 1302 executing thereon provides an example of a sweep generator device according to certain embodiments of the present invention. While sweep generator application 1302 is shown as executing on computer 1301 for ease of illustration in FIG. 13, it should be recognized that such application 1302 may be residing and/or executing either locally on computer 1301 or on a remote computer to which computer 1301 is communicatively coupled via a communication network, such as a local area network (LAN), the Internet or other wide area network (WAN), etc. In this embodiment, sweep generator application 1302 comprises computer-executable software code stored to a computer-readable medium that is readable by a processor of computer 1301 and, when executed by such processor, causes computer 1301 to perform the various operations described further herein for such sweep generator application 1302.

Sweep generator application 1302 may receive as input 1303 (e.g., via user input to a user interface presented on a display of computer 1301 by application 1302, via file transfer, or otherwise), manufacturer specifications of one or more target seismic vibrator devices, such as those specifications of a target seismic vibrator device 1306 that is to be employed for seismic exploration. Examples of specifications that may be received include those exemplary specifications shown in Table 1 above. In certain embodiments, the manufacturer specifications of one or more target seismic vibrator devices may be hard-coded into application 1302, and/or the specifications may be read from a data storage location (e.g., from a file, etc.) by application 1302.

Sweep generator application 1302 may also receive as input 1304 (e.g., via user input to a user interface presented on a display of computer 1301 by application 1302, via file transfer, or otherwise), information defining a desired target output spectrum, such as the exemplary target output spectrum shown in FIG. 9 above. In certain embodiments, the information defining a desired target output spectrum may be input by a user via user input devices, such as a keyboard, mouse, etc.) to a user interface presented on a display of computer 1301 by application 1302, and/or the information may be read from a data storage location (e.g., from a file, etc.) by application 1302.

Sweep generator application 1302 operates, as discussed further herein, to determine a frequency sweep 1305 that may be used on a target seismic vibrator device 1306 for producing the desired target output spectrum 1304 in compliance with at least a fluid flow (or "pump") constraint imposed by the target seismic vibrator device 1306. In certain embodiments, sweep generator application 1302 determines a frequency sweep 1305 that may be used on a target seismic vibrator device 1306 for producing the desired target output spectrum 1304 in compliance with a plurality of different constraints imposed by the target seismic vibrator device 1306 or the operating environment 1309, such as by complying with Fconstraint (f)= min[Fdisp(f), Fpump(f), Fvalve(f), Fset, Fenviron(f)] described above.

The determined sweep 1305 that is generated by sweep generator application 1302 may be stored as computer-readable data (e.g., in the form of any suitable data structure, such as a file, etc.), and may be input to control logic 1307 of the target seismic vibrator device 1306. Control logic 1307 may be processor-based logic that is operable to read the sweep 1305 and cause the hydraulic seismic vibrator device to generate an output spectrum 1308 accordingly. Such control logic 1307 that is commonly employed for hydraulic seismic vibrator devices is well-known in the art, and any such control logic may be employed with embodiments of the present invention. That is, sweep generator 1302 may be configured to produce its frequency sweep 1305 in any desired format for compatibility with any control logic implementation of a target seismic vibrator device.

In certain embodiments, sweep generator application 1302 may evaluate multiple target vibrator devices (e.g., using their respective manufacturer specifications received via input 1303) and produce a frequency sweep 1305 for each of the multiple target vibrator devices. Additionally or alternatively, sweep generator application 1302 may select a most appropriate one of the multiple vibrator devices, such as one that is most optimal because it can achieve the desired target output spectrum 1304 by using a sweep 1305 that has a duration of a desired time period (e.g., the shortest time period). The sweep generator application 1302 may, in certain embodiments, be employed as a sanity check to confirm which one or more of the target vibrator devices under consideration are operationally capable of achieving the desired target output spectrum 1304, i.e., confirm which one or more of the devices under evaluation are operationally capable (in compliance with its mechanical or hydraulic constraints) of supporting a sweep for achieving the desired target output spectrum 1304.

Figure 14:
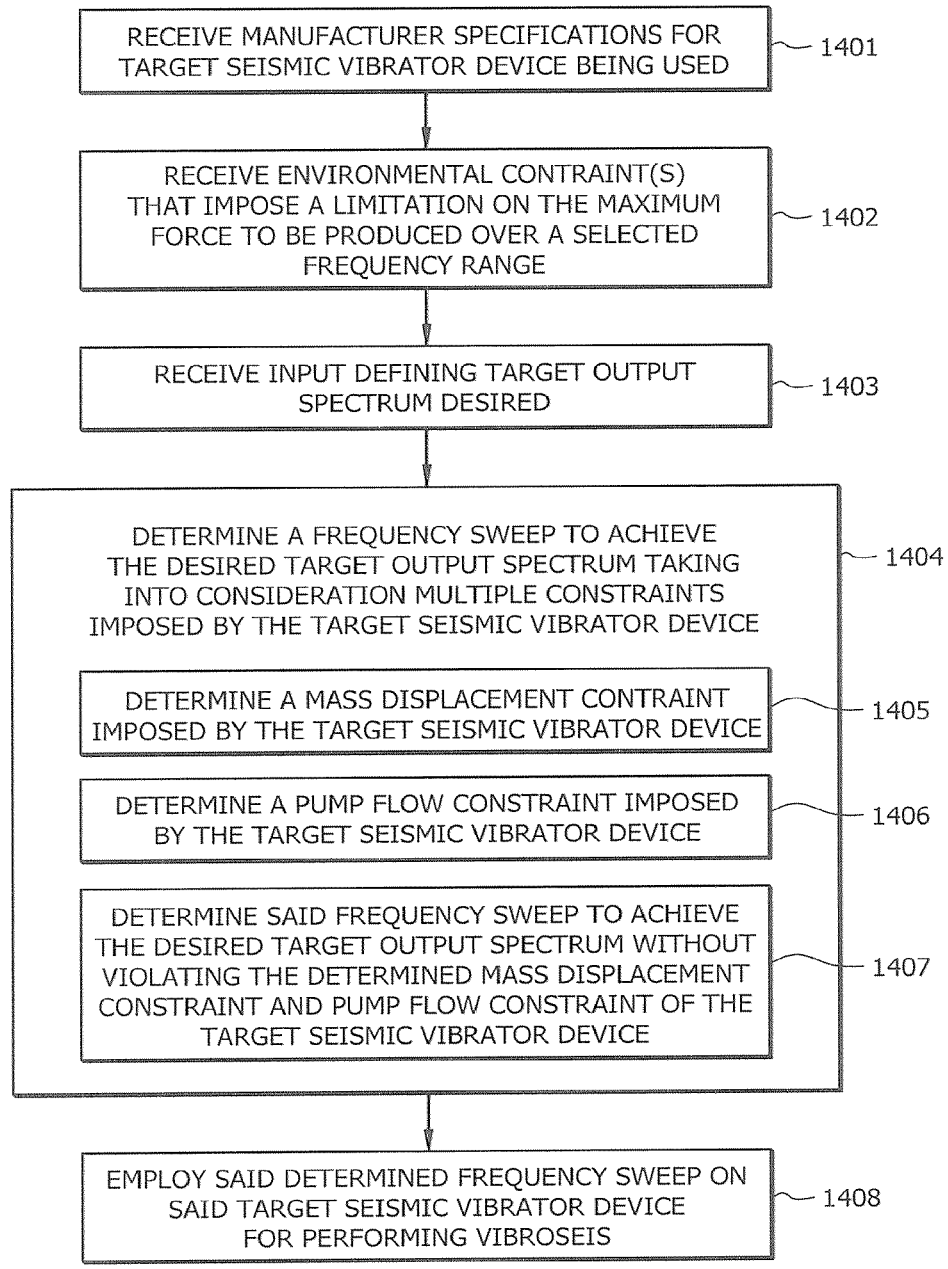
FIG. 14 shows an exemplary operational flow diagram according to one embodiment of the present invention.

FIG. 14 shows an exemplary operational flow diagram according to one embodiment of the present invention. In operational block 1401, a sweep generator application (e.g., application 1302 of FIG. 13) receives information defining various manufacturer specifications (e.g., specifications 1303 of FIG. 13, such as those exemplary specifications included in Table 1 above) for a target seismic vibrator device (e.g., seismic vibrator device 1306 of FIG. 13). The specifications may be received as input (e.g., via user input to a user interface presented on a display of computer 1301 by application 1302 of FIG. 13, via file transfer, or otherwise). In certain embodiments, the manufacturer specifications of one or more target seismic vibrator devices may be hard-coded into sweep generator application 1302, and/or the specifications may be read from a data storage location (e.g., from a file, etc.) by application 1302.

In operational block 1402, the sweep generator application may receive input defining constraints imposed upon the maximum output of the vibrator due to the operating environment (e.g., input 1309 of FIG. 13). For example, if the seismic survey is conducted in an area where structures are nearby, it may be desirable to limit the maximum output of the vibrator over a certain frequency range thereby limiting the maximum amount of ground roll (surface wave energy) generated that may induce undesirable structural vibrations in nearby buildings, pipelines or bridges. The environmental constraints may be received as input (e.g., via user input to a user interface presented on a display of computer 1301 by application 1302 of FIG. 13, via file transfer, or otherwise).

In operational block 1403, the sweep generator application (e.g., application 1302 of FIG. 13) receives input (e.g., input 1304 of FIG. 13) defining a desired target output spectrum, such as the exemplary target output spectrum shown in FIG. 9 above. In certain embodiments, the information defining a desired target output spectrum may be input by a user (via user input devices, such as a keyboard, mouse, etc.) to a user interface presented on a display of computer 1301 by application 1302, and/or the information may be read from a data storage location (e.g., from a file, etc.) by application 1302. The information defining the desired target output spectrum may include information specifying, for example, one or more of a force amplitude spectrum to be output by the vibrator device (such as the exemplary flat force output amplitude spectrum in the example of FIG. 9), a desired sweep range (such as the exemplary range of 3 Hz to 123 Hz in the example of FIG. 9), and a desired sweep length (such as the exemplary sweep length of 20 seconds in the example discussed above with FIG. 9).

In operational block 1404, the sweep generator application determines a frequency sweep to achieve the desired target output spectrum in compliance with multiple constraints imposed by the target seismic vibrator device. As discussed further herein, such determined frequency sweep may be a nonlinear frequency sweep. Further, as described further herein, the sweep generator application determines the multiple constraints imposed by the target seismic vibrator device based at least in part on the manufacturer specifications received in block 1401. As shown in block 1405, the sweep generator application determines a mass displacement constraint imposed by the target seismic vibrator device, in this illustrative embodiment. Further, in block 1406, the sweep generator application determines a pump flow (or "fluid flow") constraint imposed by the target seismic vibrator device, in this illustrative embodiment. In block 1407, the sweep generator application determines the frequency sweep to achieve the desired target output spectrum (defined in the information received in block 1403) in compliance with the determined mass displacement constraint and pump flow constraint of the target seismic vibrator device. Of course, as discussed further herein, various other constraints in addition to the mass displacement and pump flow constraints may also be taken into consideration by the sweep generator application. For instance, the sweep generator application may employ Fconstraint(f)=min[Fdisp(f), Fpump(f), Fvalve(f), Fenviron(f), Fset], as described above, in certain embodiments to determine a frequency sweep that achieves the desired target output spectrum in compliance with the various constraints represented by Fdisp, Fpump, Fvalve, Fenviron, and Fset.

Information defining the determined frequency sweep may be stored by the sweep generator application to computer-readable medium, and that information may then be input (e.g., via a computer network, user input, read from a file, read from a memory storage device, or otherwise) to control logic 1307 of the target seismic vibrator device. Accordingly, as shown in operational block 1408, the determined frequency sweep may then be employed on the target seismic vibrator device (e.g., used by control logic 1307) for performing seismic exploration (e.g., vibroseis).

The following is an exemplary discussion of one application of an embodiment of the present invention (developed using the MathCad program) for creating some very low frequency sweeps. This example is merely for illustrative purposes for one exemplary application, and is not intended to be limiting on the above-described concepts in any way.

First, various variables are initialized, as follows:

F0:=1, start frequency in Hz;

F1:=80, end frequency in Hz;

SL:=30, sweep length in seconds;

Fcorner:=F0, a half-power corner frequency (Hz);

TL:=0.1, the duration of the start and end cosine tapers in seconds;

$\phi_0$=0, the phase offset in radians;

dt=0.0005, the sample interval (seconds).

Then the specification parameters for the particular vibrator model are entered:

Fmax=267400, the holddown force (N);

Mr=3500, the reaction mass size (kg);

Xmax=0.0508, the peak mass stroke (m);

Qmax=0.0097, the pump rated flow (m³/s);

Ap=0.0133, the actuator piston area (m²).

In the above, Xmax is the maximum useable peak stroke (m) for the Model A and Qmax is die maximum average flow m^3/s, and Fmax is the maximum force (N). Then, the following computations are performed:

$$Fdisp(f) := \min[F\max, [Mr \cdot X\max \cdot (f \cdot 2 \cdot \pi)^2]]$$

$$Fflow(f) := 9.87 \cdot f \cdot Mr \cdot \frac{Q\max}{Ap}.$$

The term "Mr·Xmax·(f·2·π)²" represents the maximum sinusoidal force that could be created by the actuator at low frequency if the mass was driven +/−Xmax; i.e. full stroke. This follows from Newtons second law of motion. The term "Xmax·(f·2π)²" is the peak acceleration and Mr is the reaction mass size, since we are dealing with sinusoids and acceleration is the second derivative with respect to time of the displacement. In this example, there are no environmental constraints considered.

Now, the maximum force is limited to the combined constraints of mass displacement, fluid flow and desired maximum force setting (Fset), as follows:

$F$set:=0.9·$F$max $F$set=2.406×10⁵

$F$constraint(f):=min(Fdisp(f),Fflow(f),Fset)

Figure 15:
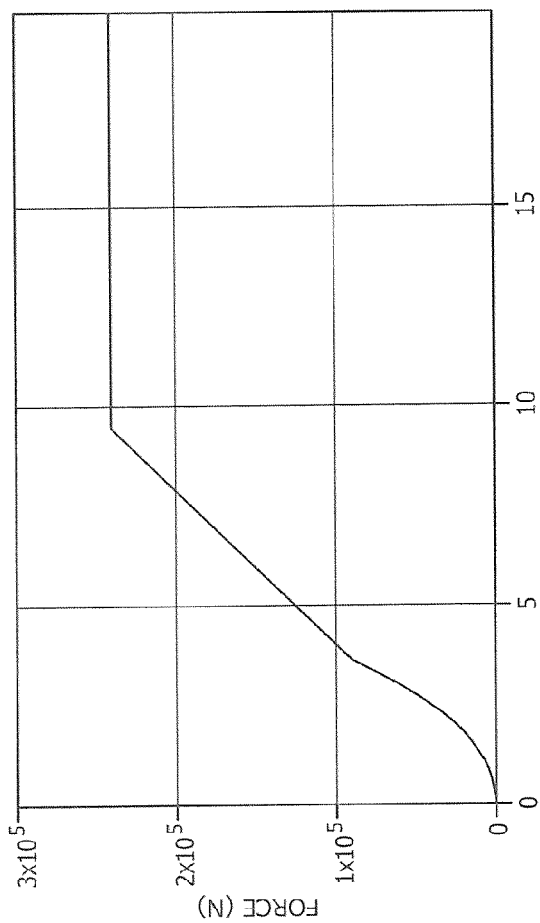
FIG. 15 shows the combined restraints that stroke, flow and drive level impose on the force output of an exemplary vibrator Model A.

The constraints on force that are imposed over a range of frequencies in this example is illustrated in the graph of FIG. 15. The graph shown is of the aforementioned function Fconstraint(f) versus frequency.

Now, an β value is chosen so that the sweep being generated ends up at F1 at a time corresponding to SL.

$$n := 2$$

$$\text{Target}(f) := \text{if}\left[F0 \leq f \leq F1, \frac{\left(\frac{f}{F\text{corner}}\right)^n}{\sqrt{\left[1 + \left(\frac{f}{F\text{corner}}\right)^{2n}\right]}}, 10^{-2}\right]$$

Figure 16:
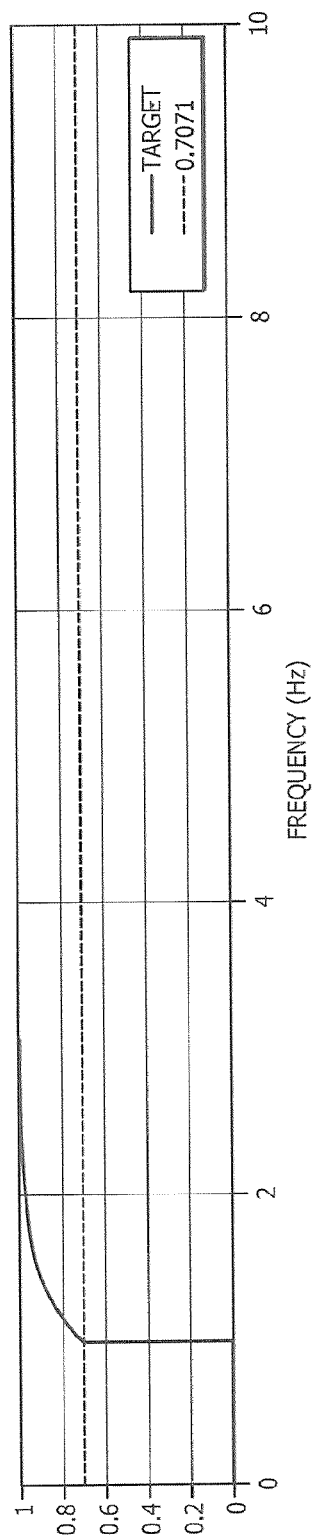
FIG. 16 shows an expanded view of an exemplary normalized target spectral density profile versus frequency spanning 0 to 10 Hz on a linear scale.

The resulting target spectrum is illustrated for this example in the graph of FIG. 16, with a zoom on the portion of the curve extending from 0 to 10-Hz.

From a previous run it was determined that:

β=5.69 and N=60,000.

The sweep rate "SR" as a function of instantaneous frequency "f" in Hz is given by:

$SR(f)$=[$F$constraint($f$)/($F$max·Target($f$))]²·[$F$1−$F$0)/$SL$]·β, for F0≤f≤F1; otherwise 0

Figure 17:
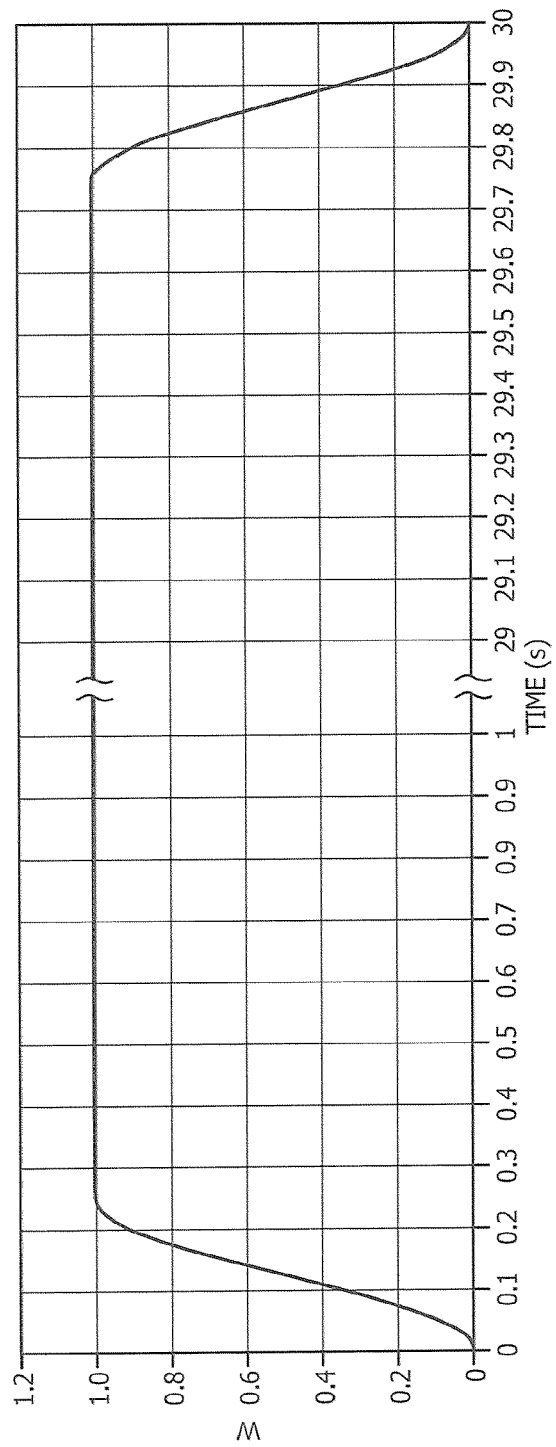
FIG. 17 shows an exemplary cosine taper window function versus time for a 30 second sweep.

A cosine taper window function was selected to define a vector of length "N+1" called "W" with FIG. 17 providing a graphical depiction.

The instantaneous frequency and phase were computed recursively as follows:

For j=1 ... N $\phi_0$=0

$Hz_0$:=F0

$Hz_j$:=$Hz_{j-1}$dt·SR($Hz_{j-1}$)

$\phi_j$:=$\phi_{j-1}$+dt·[2·π·($Hz_{j-1}$+$Hz_j$)0.5]

$S_j$=$W_j$ sin($\phi_j$)·Fconstraint($Hz_j$).

Figure 18:
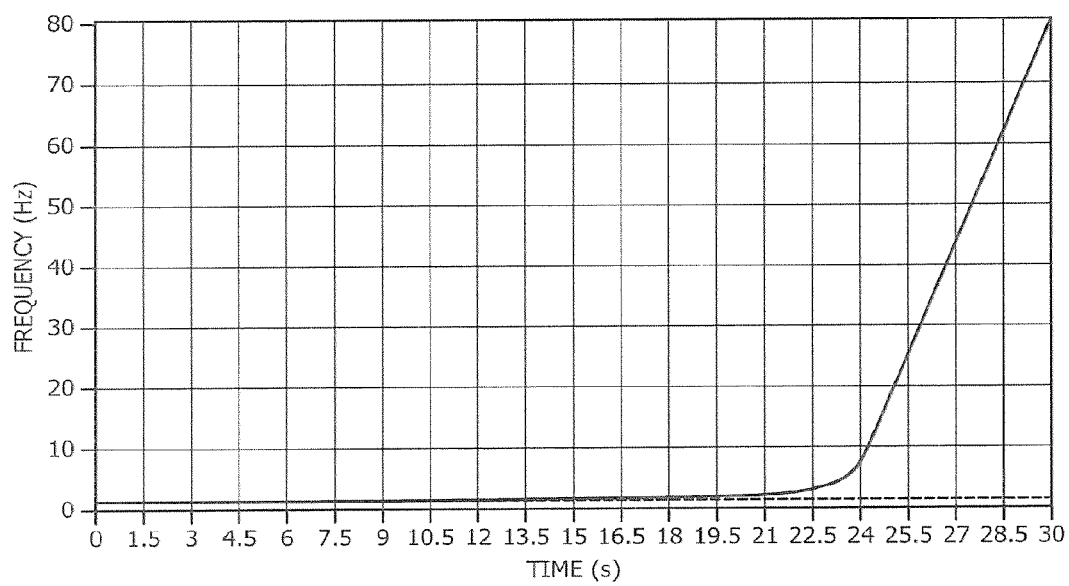
FIG. 18 shows the graph of instantaneous frequency versus time for a 30 second nonlinear sweep generated to match the target spectral density objective.

FIG. 18 displays the resultant instantaneous frequency versus time function. As can be seen a considerable amount of time is spent below 5 Hz, about 23 seconds of the 30 second sweep length is spent there to build up the energy at the low frequencies in order to compensate for the low force output of the vibrator through the range of frequencies 1 to 5 Hz. This amount of dwell time at these low frequencies would not be possible unless the pump flow constraint was observed.

Figure 19:
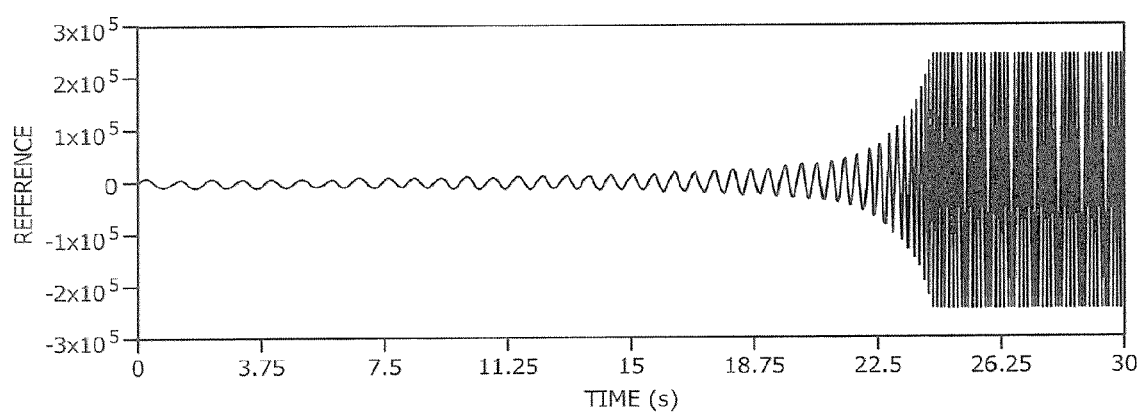
FIG. 19 shows the signal output of the sweep generator expressed as a reference force in Newtons.

FIG. 19 displays the resultant signal "S" (reference signal) vs. time expressed as a force in Newtons. Again the low amplitude of the signal is obvious through about the first 23 seconds of the sweep.

Figure 20:
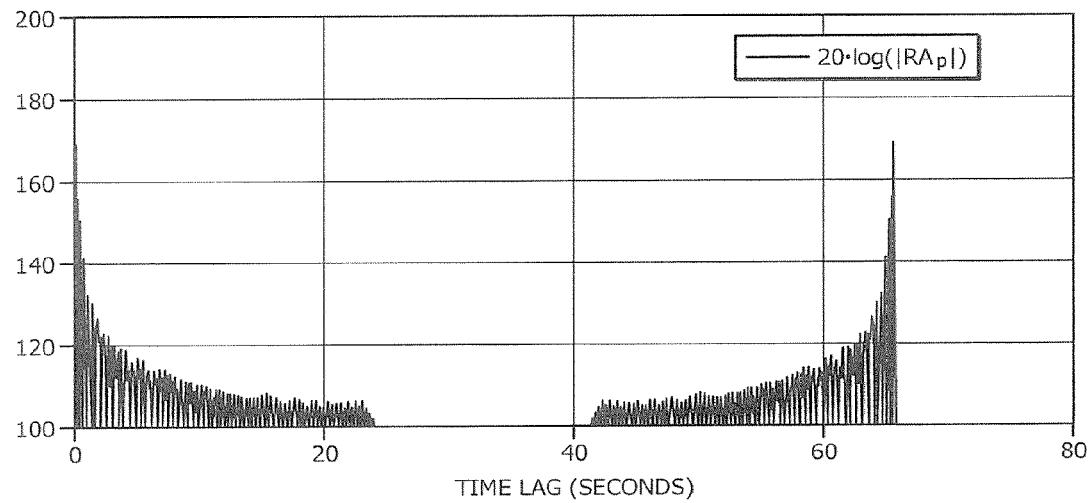
FIG. 20 shows the magnitude of the autocorrelation of the sweep generator output signal versus time lag on a decibel scale.

As a check on the properties of the frequency sweep "S", the reference signal was autocorrelated to detect any anomalies that might produce excessive sidelobe levels. In particular we want to check that sidelobe levels trail off as we move away from zero lag. High sidelobe levels can mask deep reflection events. The magnitude of the autocorrelation "RA" expressed in decibels appears in FIG. 20. The autocorrelation function was computed in the frequency domain and is symmetric about time zero, but because the autocorrelation was computed in the frequency domain using a fast fourier transform method there is a "wraparound effect" that is well known to those skilled in the art so time lag values appear at the right.

Figure 21:
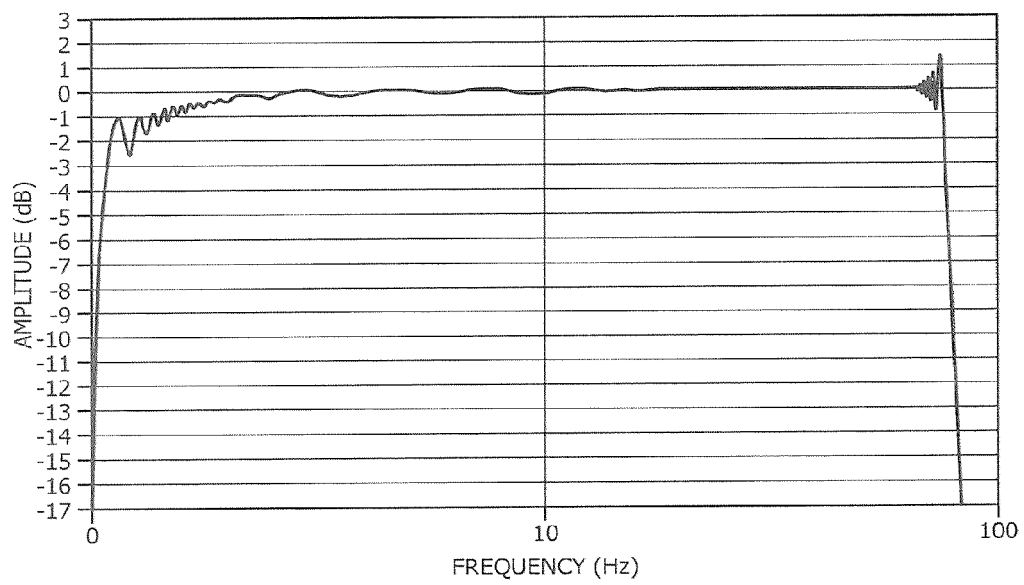
FIG. 21 shows the spectral density of the sweep generator output si al versus frequency on a decibel scale.

FIG. 21 shows the resulting spectral density of the sweep "S" plotted on a decibel scale versus frequency displayed on a logarithmic scale. The resultant spectrum closely approximates the desired target spectrum with some Gibb's phenomenon effects occurring near the start and end frequencies due to the very short taper length that was applied. In general, use of a longer taper length would have reduced this ripple effect.

Embodiments, or portions thereof, may be embodied in program or code segments operable upon a processor-based system (e.g., computer system) for performing functions and operations as described herein for determining a frequency sweep (such as sweep 1305 of FIG. 13) for achieving a desired target output spectrum (e.g., spectrum 1304 of FIG. 13) in compliance with constraint(s) of a target hydraulic seismic vibrator device, such as fluid flow and mass displacement constraints. The program or code segments making up the various embodiments may be stored in a computer-readable medium, which may comprise any suitable medium for temporarily or permanently storing such code. Examples of the computer-readable medium include such physical computer-readable media as an electronic memory circuit, a semi-conductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like. The software program may be implemented as a sweep generator application 1302, such as described above with FIG. 13.

Figure 22:
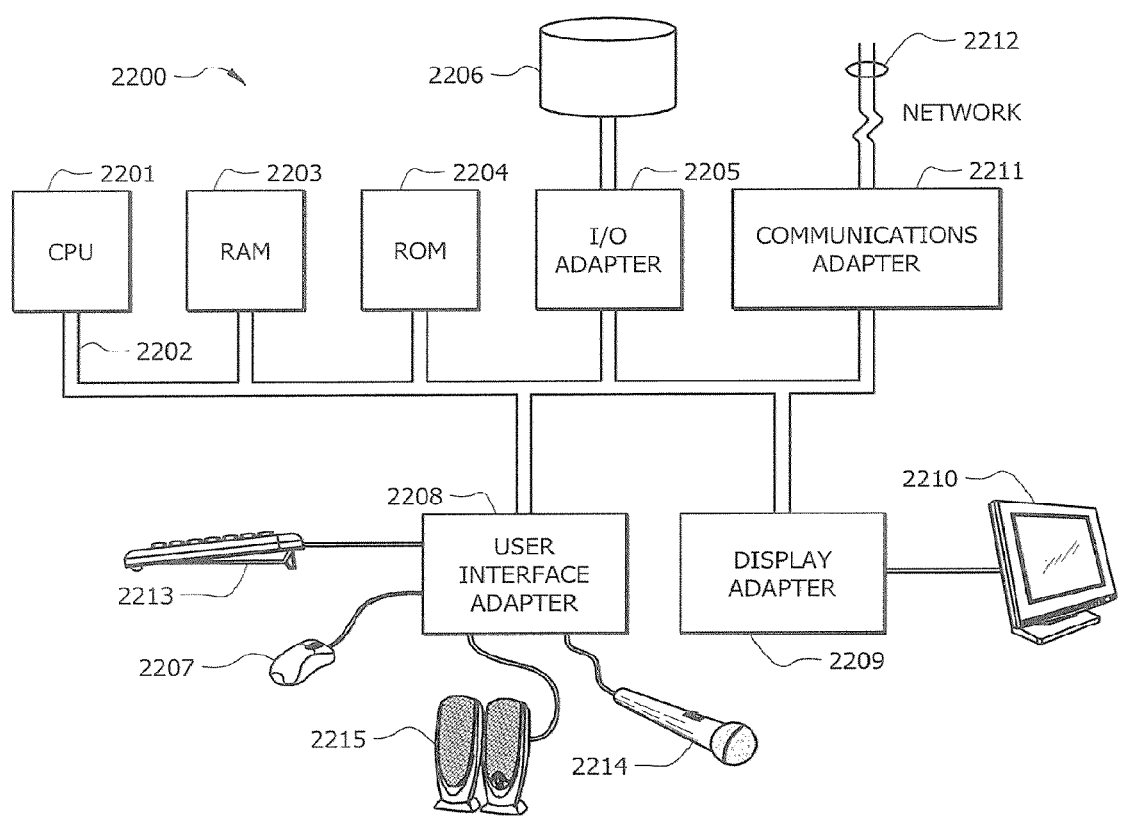
FIG. 22 illustrates an exemplary computer system on which software for performing operations described above for determining a frequency sweep according to embodiments of the present invention may be implemented.

FIG. 22 illustrates an exemplary computer system 2200 on which software for performing operations described above for determining a frequency sweep according to embodiments of the present invention may be implemented. Central processing unit (CPU) 2201 is coupled to system bus 2202. While a single CPU 2201 is illustrated, it should be recognized that computer system 2200 may comprise a plurality of processing units (e.g., CPUs 2201) to be employed for parallel computing. CPU(s) 2201 may be any general-purpose CPU(s). The present invention is not restricted by the architecture of CPU(s) 2201 (or other components of exemplary system 2200) as long as CPU(s) 2201 (and other components of system 2200) supports the inventive operations as described herein. CPU(s) 2201 may execute the various logical instructions according to embodiments described above. For example, CPU(s) 2201 may execute machine-level instructions for performing processing of the sweep generator application described above, such as for the exemplary operational flow of FIG. 14.

Computer system 2200 also preferably includes random access memory (RAM) 2203, which may be SRAM, DRAM, SDRAM, or the like. Computer system 2200 preferably includes read-only memory (ROM) 2204 which may be PROM, EPROM, EEPROM, or the like. RAM 2203 and ROM 2204 hold user and system data and programs, as is well known in the art.

Computer system 2200 also preferably includes input/output (I/O) adapter 2205, communications adapter 2211, user interface adapter 2208, and display adapter 2209. I/O adapter 2205, user interface adapter 2208, and/or communications adapter 2211 may, in certain embodiments, enable a user to interact with computer system 2200 in order to input information.

I/O adapter 2205 preferably connects to storage device(s) 2206, such as one or more of hard drive, compact disc (CD) drive, floppy disk drive, tape drive, etc. to computer system 2200. The storage devices may be utilized when RAM 2203 is insufficient for the memory requirements associated with storing data for operations of embodiments of the present invention. The data storage of computer system 2200 may be used for storing such information as received manufacturer specifications of one or more seismic vibrator devices (e.g., specifications 1303 of FIG. 13), received information defining a maximum force that can be utilized over a certain range of frequencies due to environmental impact concerns, received information defining a desired target output spectrum (e.g., information 1304 of FIG. 13), a generated frequency sweep (e.g., sweep 1305 of FIG. 13), and/or other data used or generated in accordance with embodiments of the present invention. Communications adapter 2211 is preferably adapted to couple computer system 2200 to network 2212, which may enable information to be input to and/or output from system 2200 via such network 2212 (e.g., the Internet or other wide-area network, a local-area network, a public or private switched telephony network, a wireless network, any combination of the foregoing). User interface adapter 2208 couples user input devices, such as keyboard 2213, pointing device 2207, and microphone 2214 and/or output devices, such as speaker(s) 2215 to computer system 2200. Display adapter 2209 is driven by CPU(s) 2201 to control the display on display device 2210 to, for example, display a user interface of sweep generator application 1302 for receiving information, such as information 1303 and/or 1304 from a user, according to certain embodiments.

It shall be appreciated that the present invention is not limited to the architecture of system 2200. For example, any suitable processor-based device may be utilized for implementing all or a portion of embodiments of the present invention, including without limitation personal computers, laptop computers, computer workstations, servers, and/or other multi-processor computing devices. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

It shall also be appreciated that the present invention is not limited to use with hydraulic vibrator devices. Seismic vibrators equipped with electric actuators are subject to similar constraints. For example there may be certain voltage and current limitations on electric seismic vibrators as well as stroke limitations imposed either by the power amplifier used to drive them, or the power supply, or an upper limit on peak current may be determined by other factors like degaussing of magnets, thermal issues or current rating for wires in electromagnets. The useable upper limit on the voltage supplied to drive the vibrator may be determined by the power supply or even voltage limits on wire insulation. Embodiments of the present invention may, accordingly, be implemented consistent with the concepts described above to accommodate constraints imposed by electric seismic vibrators to generate sweeps that meet a target spectral density subject to constraints imposed by the electrical vibratory system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for generating a target output spectrum for use in seismic exploration to be achieved by a hydraulic seismic vibrator device, the method comprising:
  receiving constraint information related to the hydraulic seismic vibrator device;
  using a mathematical relationship for achieving the target output spectrum, wherein the mathematical relationship relates the (i) the constraint information of the hydraulic seismic vibrator device, (ii) the target output spectrum, and (iii) a frequency sweep rate; and
  determining in a processor-based device, based on the mathematical relationship, a frequency sweep for achieving the target output spectrum by the hydraulic seismic vibrator device in compliance with the constraint information of the hydraulic seismic vibrator device,
  wherein the mathematical relationship is given by:

$$SR(f)=\beta \cdot [F_{constraint}(f)/F_{target}(f)]^2 \cdot [F1-F0]/SL,$$

where f is an instantaneous frequency, SL is a sweep length with a start frequency F0 and an end frequency F1, $F_{target}(f)$ is the target output spectrum, $F_{constraint}(f)$ is a force constraint related to the constraint information, SR(f) is the frequency sweep rate, and $\beta$ is a constant.

2. The method of claim 1, further comprising:
  employing said determined frequency sweep by said hydraulic seismic vibrator device for generating said target output spectrum.

3. The method of claim 1, wherein said frequency sweep comprises a nonlinear frequency sweep.

4. The method of claim 1, wherein said determining comprises:
  determining, based on specifications of said hydraulic seismic vibrator device, a fluid flow constraint that is imposed.

5. The method of claim 1, further comprising:
  receiving specifications of one or more hydraulic seismic vibrator devices.

6. The method of claim 5, wherein the specifications comprise one or more of:
  holddown force;
  reaction mass size;
  peak mass stroke;
  pump rated flow;
  servovalve opening; and
  actuator piston area.

7. The method of claim 1, wherein said determining said frequency sweep comprises:
  determining said frequency sweep for achieving said target output spectrum by said hydraulic seismic vibrator device in compliance with a plurality of different constraints imposed by said hydraulic seismic vibrator device.

8. The method of claim 7, wherein said plurality of different constraints comprise a fluid flow constraint and at least one of mass displacement constraint, output force constraint imposed by a servo valve, and a desired maximum force setting.

9. The method of claim 1, wherein said constraint information comprise a fluid flow constraint and a mass displacement constraint.

10. The method of claim 1, wherein said determining said frequency sweep comprises:
  determining said frequency sweep for achieving said target output spectrum by said hydraulic seismic vibrator device in compliance with a plurality of different constraints.

11. The method of claim 10, wherein said plurality of different constraints comprise:
  at least one operational constraint imposed by said hydraulic seismic vibrator device.

12. The method of claim 10, wherein said plurality of different constraints comprise at least one environmental constraint that limits force output over a range of frequencies to avoid property damage or exciting resonance in a structure within a location at which the hydraulic seismic vibrator device is to be employed.

13. A method for calculating a target output spectrum to be achieved by a vibrator device, the method comprising:
  receiving constraint information related to the vibrator device;
  using a mathematical relationship for achieving the target output spectrum, wherein the mathematical relationship relates the (i) the constraint information of the vibrator device, (ii) the target output spectrum, and (iii) a frequency sweep rate; and
  determining, based on the mathematical relationship, a frequency sweep for achieving the target output spectrum by the vibrator device in compliance with the constraint information of the vibrator device,
  wherein said receiving, said using, and said determining are performed by a processor-based device, and
  wherein the mathematical relationship is given by:

$$SR(f)=\beta \cdot [F_{constraint}(f)/F_{target}(f)]^2 \cdot [F1-F0]/SL,$$

where f is an instantaneous frequency, SL is a sweep length with a start frequency F0 and an end frequency F1, $F_{target}(f)$ is the target output spectrum, $F_{constraint}(f)$ is a force constraint related to the constraint information, SR(f) is the frequency sweep rate, and $\beta$ is a constant.

14. The method of claim 13, further comprising:
  receiving specifications of said vibrator device, wherein said specifications comprise one or more of, holddown force;
reaction mass size;
peak mass stroke;
pump rated flow;
servovalve opening; and
actuator piston area.

15. The method of claim 13, wherein said determining step comprises:
determining the frequency sweep for achieving said target output spectrum by a hydraulic seismic vibrator device in compliance with a fluid flow constraint and at least one of mass displacement constraint, output force constraint imposed by a servo valve, and a desired maximum force setting.

16. The method of claim 13, wherein said determining step comprises:
determining the frequency sweep for achieving said target output spectrum by a hydraulic seismic vibrator device in compliance with a fluid flow constraint and at least one environmental constraint that limits a force output over a range of frequencies to avoid property damage or exciting resonance in a structure within a location at which the hydraulic seismic vibrator device is to be employed.

17. A computer device for generating a target output spectrum for use in seismic exploration to be achieved by a vibrator device, the computer device comprising:
an interface configured to receive constraint information related to the hydraulic seismic vibrator device; and
a processor connected to the interface and configured to,
use a mathematical relationship for achieving the target output spectrum, wherein the mathematical relationship relates the (i) the constraint information of the vibrator device, (ii) the target output spectrum, and (iii) a frequency sweep rate; and
determine, based on the mathematical relationship, a frequency sweep for achieving the target output spectrum by the vibrator device in compliance with the constraint information of the vibrator device,
wherein the mathematical relationship is given by, $$SR(f) = \beta \cdot [F_{constraint}(f)/F_{target}(f)]^2 \cdot [F1-F0]/SL,$$

where f is an instantaneous frequency, SL is a sweep length with a start frequency F0 and an end frequency F1, $F_{target}(f)$ is the target output spectrum, $F_{constraint}(f)$ is a force constraint related to the constraint information, SR(f) is the frequency sweep rate, and $\beta$ is a constant.

* * * * *

UNITED STATES PATENT AND TRADEMARK OFFICE
CERTIFICATE OF CORRECTION

| | |
|---|---|
| PATENT NO. | : 8,559,275 B2 |
| APPLICATION NO. | : 13/585213 |
| DATED | : October 15, 2013 |
| INVENTOR(S) | : Sallas |

It is certified that error appears in the above-identified patent and that said Letters Patent is hereby corrected as shown below:

Title page

On Page 2, in Item (56), under "OTHER PUBLICATIONS", in Column 2, Lines 6-8, delete "Sallas, J.J., Gibson, J.B., Lin, F., Winter, 0., Montgomery, B., Nagarajappa, P., "Broadband Vibroseis using simUltaneous pseudorandom sweeps", SEG Expanded Abstracts, 100-104.".

Specification

In Column 4, Line 36, delete "Sagaini" and insert -- Bagaini --, therefor.

In Column 4, Line 49, delete "weigh," and insert -- weight, --, therefor.

In Column 8, Line 1, delete "Follows" and insert -- follows --, therefor.

In Column 9, Line 4, delete "invention, and" and insert -- invention; --, therefor.

In Column 9, Line 28, delete "si al" and insert -- signal --, therefor.

In Column 10, Line 56, delete "have bee" and insert -- have been --, therefor.

In Column 10, Line 57, delete "so urce." and insert -- source. --, therefor.

In Column 13, Line 22, delete "velocity" and insert -- (velocity --, therefor.

In Column 16, Line 21, delete "so tha" and insert -- so that the --, therefor.

In Column 17, Line 32, delete "spectrum." and insert -- spectrum, --, therefor.

In Column 17, Line 45, delete "overestimate" and insert -- overestimate the --, therefor.

Signed and Sealed this
Eighth Day of December, 2015

Michelle K. Lee
*Director of the United States Patent and Trademark Office*

CERTIFICATE OF CORRECTION (continued)
U.S. Pat. No. 8,559,275 B2

Specification

In Column 19, Line 2, delete "hut with" and insert -- but with --, therefor.

In Column 21, Line 25, delete "three is" and insert -- force is --, therefor.

In Column 23, Line 28, delete "via user" and insert -- (via user --, therefor.

In Column 25, Line 65, delete "($m^2$)" and insert -- ($m^2$). --, therefor.

In Column 25, Line 67, delete "is die" and insert -- is the --, therefor.

In Column 28, Line 39, delete "telephony" and insert -- telephone --, therefor.